(12) United States Patent
Richerzhagen et al.

(10) Patent No.: US 11,318,560 B2
(45) Date of Patent: May 3, 2022

(54) PROCESS OF TREATING A WORKPIECE USING A LIQUID JET GUIDED LASER BEAM

(71) Applicant: SYNOVA SA, Duillier (CH)

(72) Inventors: Bernold Richerzhagen, Saint-Sulpice (CH); Stephane Delahaye, Gex (FR); Florent Bruckert, Evian-les-Bains (FR); Ronan Martin, Ecublens (CH); Benjamin Carron, Savigny (CH); Annika Richmann, Lausanne (CH); Yury Kuzminykh, Chavannes-près-Renens (CH)

(73) Assignee: SYNOVA SA, Duillier (CH)

( * ) Notice: Subject to any disclaimer, the term of this patent is extended or adjusted under 35 U.S.C. 154(b) by 388 days.

(21) Appl. No.: 15/747,927

(22) PCT Filed: Jul. 27, 2016

(86) PCT No.: PCT/EP2016/067911
§ 371 (c)(1),
(2) Date: Jan. 26, 2018

(87) PCT Pub. No.: WO2017/017142
PCT Pub. Date: Feb. 2, 2017

(65) Prior Publication Data
US 2018/0214982 A1    Aug. 2, 2018

(30) Foreign Application Priority Data

Jul. 28, 2015  (EP) .................................. 15002232

(51) Int. Cl.
*B23K 26/14*      (2014.01)
*B23K 26/146*    (2014.01)
(Continued)

(52) U.S. Cl.
CPC ............ *B23K 26/146* (2015.10); *B23K 26/03* (2013.01); *B23K 26/08* (2013.01);
(Continued)

(58) Field of Classification Search
CPC .............. B23K 26/0823; B23K 26/146; B23K 26/0665; B23K 26/364; B23K 26/40;
(Continued)

(56) References Cited

U.S. PATENT DOCUMENTS 3,991,296 A   11/1976  Kojima et al.
5,902,499 A    5/1999  Richerzhagen
(Continued)

FOREIGN PATENT DOCUMENTS

DE   41 38 468 A1    6/1993
DE   102 96 913 T5   4/2004
(Continued)

OTHER PUBLICATIONS

European Search Report dated Sep. 9, 2020 in corresponding European Application No. 20173855.6.

*Primary Examiner* — Charles P. Cheyney
(74) *Attorney, Agent, or Firm* — Birch, Stewart, Kolasch & Birch, LLP

(57) ABSTRACT

The invention concerns a process for treating a workpiece, preferably for shaping a workpiece by ablating material, by a liquid jet guided laser beam. The process comprises the following steps: Production of a liquid jet by a nozzle; impinging the liquid jet on a reference surface allocated to the workpiece, whereby an intersection of the liquid jet with the reference surface defines a liquid jet-footprint; effecting a displacement between the liquid jet and the reference surface, whereby the liquid jet-footprint evolves to a trace along a trajectory associated with the trace during the time frame, wherein the trace covers a trace-area; irradiating the (Continued)

workpiece at least during part of the time frame with a laser beam coupled into the liquid jet, preferably for ablating material such that the trace has at least one overlap-area, wherein each of the at least one overlap-areas is defined by an associated common area of an associated second length-section of the trace and an associated first length-section of the trace and wherein the workpiece is irradiated by the laser beam along at least one of the length-sections. It concerns further a computerized numerical control (CNC) program for controlling a liquid jet guided laser machining device and a computer readable medium containing such a CNC program. Further, it contains a computer program for generating the above mentioned CNC program. Finally the invention concerns a liquid jet guided laser machining device to perform the above mentioned process.

7 Claims, 12 Drawing Sheets

(51) Int. Cl.
| | | |
|---|---|---|
| *B23K 26/08* | (2014.01) | |
| *B23K 26/361* | (2014.01) | |
| *B23K 26/03* | (2006.01) | |
| *B23K 26/362* | (2014.01) | |
| *B26F 1/31* | (2006.01) | |
| *B26F 3/00* | (2006.01) | |

(52) U.S. Cl.
CPC ........ *B23K 26/0876* (2013.01); *B23K 26/361* (2015.10); *B23K 26/362* (2013.01); *B26F 1/31* (2013.01); *B26F 3/004* (2013.01)

(58) Field of Classification Search
CPC .. B23K 26/082; B23K 26/083; B23K 26/342; B23K 26/03; B23K 26/362; B23K 26/0876; B23K 26/08; B23K 26/361; B26F 1/31; B26F 3/004
USPC .......................... 219/121.69, 121.84, 121.67

See application file for complete search history.

(56) References Cited

U.S. PATENT DOCUMENTS

| | | | |
|---|---|---|---|
| 6,555,017 B1* | 4/2003 | Rushford | C03C 15/00 134/30 |
| 7,705,266 B2* | 4/2010 | Koseki | B23K 26/02 219/121.67 |
| 7,919,727 B2* | 4/2011 | Nishiya | B23K 26/1476 219/121.6 |
| 8,134,098 B2* | 3/2012 | Muratsubaki | B23K 26/146 219/121.67 |
| 9,649,722 B2* | 5/2017 | Wu | B23K 26/146 |
| 2001/0010423 A1 | 8/2001 | Bauer et al. | |
| 2002/0149136 A1 | 10/2002 | Baird et al. | |
| 2004/0026382 A1 | 2/2004 | Richerzhagen | |
| 2005/0048873 A1 | 3/2005 | Alberts et al. | |
| 2005/0126472 A1 | 6/2005 | Popescu et al. | |
| 2007/0193990 A1 | 8/2007 | Richerzhagen et al. | |
| 2007/0278195 A1 | 12/2007 | Richerzhagen et al. | |
| 2009/0238994 A1* | 9/2009 | Mette | B23K 26/146 427/554 |
| 2010/0078768 A1 | 4/2010 | Dydyk et al. | |
| 2010/0089886 A1* | 4/2010 | Sercel | B23K 26/032 219/121.72 |
| 2010/0213166 A1* | 8/2010 | Kray | B23K 26/146 216/37 |
| 2011/0089152 A1* | 4/2011 | Anderson | B23K 26/009 219/121.69 |
| 2011/0240615 A1* | 10/2011 | Suruceanu | B23K 26/40 219/121.71 |
| 2012/0074105 A1* | 3/2012 | Okamoto | B23K 26/146 219/121.62 |
| 2012/0074110 A1* | 3/2012 | Zediker | B23K 26/1224 219/121.72 |
| 2016/0368090 A1* | 12/2016 | Gaebelein | B29C 33/3842 |
| 2017/0252866 A1* | 9/2017 | Hu | B23K 26/1488 |
| 2018/0029159 A1* | 2/2018 | Toyama | B23K 26/032 |
| 2018/0161924 A1* | 6/2018 | Werner | B23K 26/03 |

FOREIGN PATENT DOCUMENTS

| | | |
|---|---|---|
| DE | 10 2011 108 405 A1 | 1/2013 |
| EP | 0 762 947 B1 | 3/2003 |
| EP | 1 269 535 B1 | 10/2007 |
| EP | 2 189 236 B1 | 6/2012 |
| JP | 2004-140239 A | 5/2004 |
| WO | WO 99/56907 A1 | 11/1999 |
| WO | WO 2005/110662 A1 | 11/2005 |
| WO | WO 2006/050622 A1 | 5/2006 |
| WO | WO 2010/057328 A1 | 5/2010 |

* cited by examiner

PROCESS OF TREATING A WORKPIECE USING A LIQUID JET GUIDED LASER BEAM

TECHNICAL FIELD

The invention concerns a process for treating a workpiece, preferably for shaping a workpiece by ablating material, by a liquid jet guided laser beam. It concerns further a computerized numerical control (CNC) program for controlling a liquid jet guided laser machining device and a computer readable medium containing such a CNC program. Further, it contains a computer program for generating the above mentioned CNC program. Finally the invention concerns a liquid jet guided laser machining device to perform the above mentioned process.

BACKGROUND ART

Machining materials with a water jet guided laser has proved to be very useful and advantageous over other laser ablating techniques. A device using a liquid jet guided laser beam is known e.g. from EP 0 762 947 B1 (Synova). The technology has been continuously improved as shown in WO 99/56907 A1, EP 1 269 535 B1, WO 2005/110662 A1, WO 2006/050622 A1, EP 2 189 236 B1 and WO 2010/057328 A1.

For treating a workpiece e.g. to get a certain shape, each machine usually provides a standard treatment method. However, it may have an effect on quality and processing speed which portions are shaped first, how fast this is done. There are in most cases two, probably contradicting requirements: Being fast and being precise.

Liquid jet guided laser machining devices provide a quite unique laser treatment method. Despite the fact that they use a laser beam guided in the water jet, they are quite different from so-called dry laser machining and from laser machining using simultaneously a dry laser and a separate liquid spray or liquid jet. Such solutions are for example described in DE 41 38 468 A1 (liquid spray) or U.S. Pat. No. 3,991,296 (liquid jet). So far, the water-jet guided laser beam machining has applied a straight-forward processing strategy: Moving the liquid jet guided laser beam at a constant speed and in a given direction along the line where material should be removed. This processing strategy is analogue to drawing a curve with a pen on a paper but with the liquid jet guided laser beam being the pen and the workpiece being the paper ("pencil on paper" strategy).

Different processing strategies are known for dry laser cutting systems and also for high speed water cutting systems.

DE 10 296 913 T5 (Electro Scientific) discloses processing strategies for dry laser cutting systems. The strategy was developed to avoid redeposition of ablated material in the fresh kerf. This is achieved by separating long distance cuts into smaller segments. The laser removes material along each of these smaller segments more than once and moves on the next segment afterwards to repeat this process. A rotating mirror can cause the motion of the laser along the small segments.

DE 10 2011 108 405 (Volkswagen) also discloses a processing strategy for dry laser cutting systems. The strategy was developed to avoid redeposition of ablated material in the fresh kerf. Again, a long distance cut is not cut at once but only a first segment of it. The laser is moved back, but only up to a distance Delta to the starting point and then moved forward by the same length as before. The process is repeated and a ramp-like profile appears close to the starting point and close to the end point of the cut.

US 2005 126 472 A (Intercon Technology) suggests the above mentioned "pencil on paper" strategy for machining with a high speed water jet. A suitable choice of the path along which the liquid jet is guided can accelerate this machining process. Redeposition of material is not a concern of this machining process but the workpiece has to be well supported to prevent motion due to the impinging fluid jet.

Strategies known for laser cutting systems, as described in DE 10 296 913 T5 (Electro Scientific) or DE 10 2011 108 405 A1 (Volkswagen), cannot be transferred directly to liquid jet guided laser processing as the presence of the liquid jet changes some important features: The focus of the laser is not given by the optics in the liquid jet guided case. The liquid cools the workpiece and the liquid removes ablated material. As many of the laser processing strategies aim at minimizing thermal stresses and guiding or avoiding redeposition of ablated material, using them with a tool showing very different characteristics with respect to these points is not something a person skilled in the art would do. High speed water jet processing, as in US 2005 126 472 A (Intercon Technology), requires much higher pressures on the workpiece surface. The ablation process is different and, therefore, also the properties of the ablated material. Due to the high local pressures, the strategies known for this machining method try to avoid deformation of the workpiece. This is not necessary in the case of machining with a liquid jet guided laser beam.

SUMMARY OF THE INVENTION

The problem to be solved by the invention is to provide versatile processing strategies for liquid jet guided laser beam machining which allows a variable balance between a good treatment quality (e.g. clean cutting edge) and a high processing speed.

According to the invention, this problem is solved by a process for treating a workpiece, preferably by shaping a workpiece by ablating material, by a liquid jet guided laser beam within a time frame, comprising the following steps:
 a) producing a liquid jet by a nozzle,
 b) impinging the liquid jet on a reference surface allocated to the workpiece, whereby an intersection of the liquid jet with the reference surface defines a liquid jet-footprint,
 c) effecting a displacement between the liquid jet and the reference surface, whereby the liquid jet-footprint evolves to a trace along a trajectory associated with the trace during the time frame of the process, wherein the trace covers a trace-area,
 d) irradiating the workpiece at least during part of the time frame with a laser beam coupled into the liquid jet, whereby material is ablated,
 e) characterized in that the trace has at least one overlap-area, wherein each of the at least one overlap-areas is defined by an associated common area of an associated second length-section of the trace and an associated first length-section of the trace and wherein the workpiece is irradiated by the laser beam along at least one of the length-sections.

Surprisingly, it was found, that ablating material along overlapping paths allows machining of high quality edges at comparatively high speed with a liquid jet guided laser beam. A comparison between a kerf produced by the prior art process (35) and two kerfs produced by two different embodiments of the process according to this invention (36, 37) are shown in FIG. 12. The kerf 36 shows the result of the embodiment "parallel cutting" which is faster than the embodiment "progressive cutting" used to produce the kerf 37 in the workpiece 1.

In the context of the invention, the following explanations of the relevant terms are to be observed (the figures mentioned below are listed in the section "Brief explanation of the drawings"):

"Machining by a liquid jet guided laser beam": To determine the type of machining process in use, the time during which the material removal rate is significantly is important. In this case, there is significantly more material removed if the laser beam is coupled into the liquid jet and impinges on the workpiece compared with the material removal rate by the liquid jet alone. In fact, for most materials, the amount of material removed a liquid jet guided laser device by a liquid jet alone in will be hardly measureable. However the liquid can play a significant role in other surface treatments as it may cool the workpiece for example. As preferentially only the material removal determines the type of machining process that means that the process is a liquid jet guided laser beam machining process, even if the laser is temporarily not coupled into the liquid jet.

"up/above and down/below": These directions are defined with respect to the nozzle exit plane at the beginning of the process. If there is more than one nozzle, the direction can be defined by any one of it. The direction of the "nozzle-exit-plane-normal" pointing away from the nozzle is the "down"-direction ("down-stream of the nozzle". "up" is the opposite direction ("up-stream of the nozzle"). A height is measured positively in the up-direction. A depth is measures positively in the down-direction if not otherwise specified. "A above B" means A is higher than B and "A below B" mean A has a smaller height than B. The front side of a workpiece is directed towards the nozzle and is "above" the backside of the workpiece.

"nozzle": A device with an entry and an exit, whereby entry and exit are connected via an opening. The nozzle exit plane is a plane defined by substantially all points surrounding the nozzle exit.

"liquid jet": A liquid with a mean velocity defines a "real liquid jet", if this mean velocity is significantly different from any single particle or particle group velocity. Velocity includes here both, speed and direction. The mean speed inside the liquid jet is higher than outside and varies, but only by small amounts. The boundary of the "real liquid jet" is given either by a sudden and significant change in the mean velocity, i.e. there could be a sudden change in the mean speed and/or there could be a sudden change in the direction of the flow, or by a change in composition or both. One way of defining a boundary is to use the positions where the flow has half the maximum speed occurring at the same height. (The height is being measured along the direction of the mean velocity, starting at a reference point like e.g. the source. "Mean" is the arithmetical mean of the specified property over all involved particles.) A "real liquid jet" has an elongated shape and a cross-section which changes by small amounts with increasing distance from its source. A typical source of a "real liquid jet" is the exit of a nozzle. A "real liquid jet" ends in a disturbance which is typically either a break-up region into drops or which is the influence of an impingement on a physical surface or another obstacle (see also FIG. 2a with a "real liquid jet 4" impinging on a workpiece 1). The workpiece or another obstacle can be located so close to the liquid jet source or to the nozzle that there is no "real liquid jet" without disturbance region. In such a case, the workpiece or the obstacle can be temporary removed, such that a "real liquid jet" without disturbances at the same position, the same orientation and with the same direction and the same parameters can be produced and be used to construct an extrapolated liquid jet. This extrapolated liquid jet is then the liquid jet and the "real liquid jet" is not a part of the liquid jet at all. In all other cases, a "real liquid jet" together with its extrapolation in length defines a liquid jet: The liquid jet equals the "real liquid jet" where it exists outside the disturbance region. In flow direction afterwards, the liquid jet equals the extrapolated liquid jet. The disturbance region of the "real liquid jet" is therefore not a part of the liquid jet. In the case where there is a "real liquid jet" outside the disturbance region, the extrapolation can e.g. be a linear extrapolation based on the last 20% of length of the undisturbed "real liquid jet" (see FIG. 2a for the "real liquid jet" 4 and the extrapolated liquid jet 4*). However other mathematical or physical models, e.g. assuming a development proportional to a square root of the length, can also be used to extrapolate the "real liquid jet" to a liquid jet. Also another length section can be used as a basis for the extrapolation: it can be 90% of the length of the undisturbed "real liquid jet" or the whole length of it or just a single cross-section at a single height.

"reference surface": A theoretical or constructed infinite surface defining a 2D-coordinate system in space. During a process, the reference surface is kept constant. The reference surface is everywhere below the nozzle in the application for liquid jet guided laser beam machining. It is excluded that a nozzle-exit-plane-normal which is used in the process points in direction of the local tangent of the reference surface. "Local" means the place where a nozzle-exit-plane-normal of infinite length contacts the reference surface. Note that the reference surface does not need to be a plane: It can be curved in 3-D spatial space. Examples are a cylindrical shape, a sphere or simply a curved surface.

"reference surface allocated to the workpiece": Allocation means, that some significant points of the workpiece are in a known relationship to significant points of the reference surface. The significant points of the workpiece have to remain unchanged during the processing. They can be real points such as points where a workpiece-holder is connected or mathematical points such as the corner point or the center of mass of the unprocessed workpiece whose positions is kept as reference points although the points themselves may change their position (e.g. because the center of gravity of the workpiece changes due to cutting away material from the workpiece). Typical significant points of the workpiece are the points where the workpiece is fixed in a workpiece-holder or points marked as reference points. These points remain unchanged and unprocessed during the process. Typical significant points of the reference surface are the origin of the coordinate system defined by it. However, the choice of the significant points on or in the workpiece and of the reference surface is arbitrary as long as these points do not change during the process. Many control programs of machining devices define fixed-points with respect to which the machining is executed. Such fixed-points do often define a machining coordinate system with e.g. Cartesian coordinates $c_1$, $c_2$, $c_3$. Preferably, the reference surface is chosen to be the $c_1$-$c_2$ or the $c_1$-$c_3$ or the $c_2$-$c_3$ plane or a parallel to it. The reference surface may also be a cylinder with a rotation axis equal to the $c_1$, $c_2$ or $c_3$-axis or a sphere centered on the origin or any other point of the machining coordinate system. A reference surface 2 allocated to a workpiece 1 is shown in FIG. 1 or FIG. 2a.

"intersection": The intersection of a volume (e.g. a cylinder) and a surface (e.g. a plane oriented orthogonal to the cylinder axis) is the area (size, shape, position and orientation) on the surface which belongs to both, the surface and the volume. See for example the liquid jet footprint 5 in FIG. 2a which is an intersection between the volume of the liquid jet 4, 4* and the reference surface 2. If the reference surface is the surface and the liquid jet defines the volume, the intersection is the circular or elliptical area of the reference surface which is part of the volume occupied by the liquid jet. In the context of the invention there is only one intersection per volume: One may imagine, that the first common area "stops" the volume of continuing. E.g. the crossing of an S-shaped surface and a small cylinder of infinite length passing from the top to the bottom causes only one intersection. Without the condition of only one intersection per volume, there would be three intersections in this example. The intersection of the example has an elliptical shape as a volume with a round cross-section intersects with a suitable curved surface. The intersection is only on the top most part of the S-shaped surface. In the case of the reference surface being the surface and the liquid jet being the volume, the first common area is the common area located closest to the source of the liquid jet which a typically a nozzle.

"footprint": The impinging liquid jet defines a liquid jet-footprint on the reference surface: The liquid jet footprint is the intersection of the liquid jet and the reference surface. See for example the liquid jet footprint 5 in FIG. 2a which is an intersection between the volume of the liquid jet 4, 4* and the reference surface 2. The laser-footprint is the intersection of the laser guiding volume (typically the liquid jet) and the reference surface. If the liquid jet has a cylindrical shape with circular cross-section and if the axis of the cylindrical shape is orthogonal to the reference surface and if the reference surface is flat in the region of the intersection the footprint of the liquid jet is circular (See FIG. 2b). If the axis of the cylindrical shape is inclined at an angle between 0° and 90° the footprint will be elliptical (See FIG. 2c). If the reference surface is curved and/or the liquid jet has another cross-sectional shape, the footprint can have a different shape. Depending on the geometrical details of the liquid jet, the impinging angle and the reference surface there may be wide variety of shapes.

Determining/Measuring the liquid jet-footprint and the laser footprint: One possibility to measure the shape of the liquid jet is to use a thin sheath of a material with can be easily ablated or penetrated by the liquid jet: Placing such a sheath with the local shape of the reference surface in the reference surface under the liquid jet has the effect that the liquid jet forms a hole in the sheath. Once the hole is produced, the liquid jet passing it is undisturbed. By moving the sheath by small amounts, it can be checked if the hole produced by a disturbed liquid jet is larger than the undisturbed liquid jet. A suitable correction can (mathematically) be applied. Another possibility is to use a pin-like sensor which registers if its tip touches the liquid jet. This pin can be moved in the reference surface to "detect" the shape of the liquid-jet footprint. Similar measurement devices which can be used to determine the liquid jet-footprint are disclosed in the EP-application 14 405 052.3. Also camera systems can be used and other suitable measurement systems. The diameter of a liquid jet-footprint, which is part of a series of footprints, is defined as the maximum width of the liquid jet-footprint measured along a line perpendicular to the line connecting the footprints in order of increasing time. As the laser is coupled into the liquid jet, the laser guiding volume is the liquid jet at the time of a laser pulse. The spatial shape and the time coordinate of the laser-footprint and the liquid jet-footprint are, therefore, the same. However, there can be liquid jet-footprints at times and places where there is no laser-footprint. A laser-footprint is present if laser radiation is present which can be detected on the workpiece or at the laser source and the device settings.

"centre point": Every liquid jet-footprint has a centre point. This centre point is preferentially the center of gravity of the liquid jet-footprint. Every centre point has reference surface coordinates and a time coordinate. The time coordinate is the time at which the liquid jet-footprint to whom the centre point belongs is produced.

"effecting a displacement": A displacement between the liquid jet and the reference surface can be effected in different ways. It is e.g. possible to move the nozzle producing the liquid jet and to keep the workpiece at a fixed position and, therefore, the reference surface allocated to the workpiece. It is also possible, to move the workpiece, and, therefore, the reference surface, and to keep the nozzle producing the liquid jet at a fixed position. Further, either the workpiece or the nozzle can be tilted around any axis which is not an axis of rotational symmetry of the nozzle (if one wants to tilt the nozzle) or the workpiece (if one wants to tilt the workpiece). It may also be possible that the nozzle changes its shape such that a displacement results. It is also possible that a plurality of these motions is effected at the same time. Another possibility is that the shape of the liquid jet is changed, e.g. by electromagnetic forces acting on a suitable fluid or by blowing it in a direction or by using gravitational forces by tilting the complete assembly. The displacement causes the liquid jet-footprint to move on the reference surface.

"trace": The motion of the liquid jet-footprint on the reference surface defines a trace. The trace is essentially a set of areas (the liquid jet-footprints) with time coordinates. Liquid jet-footprints are areas on the reference surface. Therefore, the trace is also composed of areas on the reference surface. The spatial coordinates of the trace are therefore reference surface coordinates. In addition to the spatial coordinates, there is a time coordinate. The trace has a ribbon-like shape in the 2D+t-space of reference surface coordinates and time. The thickness of the trace in the time coordinate is given by the speed of the relative displacement between liquid jet and reference surface: a low speed causes a thick trace. The width of the trace depends on the diameter of the footprint. The length and spatial position of the trace depends on the directions and length of relative motion of the liquid jet-footprint on the reference surface. Because of the fact that reference surface coordinates are used and reference surface areas are the buildings blocks of the trace, it is possible that the trace passes a given area twice even if laser irradiation occurs. This would not be possible if the trace were defined by intersections between the liquid jet and the workpiece surface: The workpiece will have changed after the first pass of the liquid jet with laser irradiation, and therefore, the workpiece surface from the first pass does not exist anymore during the second pass. FIG. 3a shows a trace 8 and some of the footprints 5 that make up the trace.

"trajectory": The assembly of centre points of the liquid jet-footprints belonging to a trace defines a curve on the reference surface and in time and this 2D+t-curve (2 spatial dimensions and 1 dimension in time) is the trajectory. In FIG. 3a the trajectory 9 is shown.

"time frame of the process": A process happens during a time interval. This is the time frame of the process. Preferentially this time frame starts with the moment when the liquid jet is first produced and ends with the moment when the liquid jet is switched off.

"trace-area": The area covered by the trace, this is the trace without the time coordinates and after removing all areas covered multiple times, is the trace-area. The trace area 10 is shown in FIG. 3b. If the liquid jet were moved three times forward and backward covering each time the same area, the area of its trace is six times its trace-area as the difference in time allows distinguishing between the different passes of the trace. Without the time coordinate, all passes cover the same coordinates and it is not possible to distinguish them. They are therefore not counted multiple times when determining the trace-area and the trace-area equals the area covered by a single pass.

"centre-line": The curve of the trajectory on the reference surface is the centre-line of the trace-area. The centre-line 11 is shown in FIG. 3b. The centre-line can be derived from the trajectory by removing the time coordinates and removing all multiple counted parts of it. The centre-line and trajectory have a similar relationship with regard to each other as trace-area and trace have with regard to each other.

"irradiating with a laser beam": A laser beam can be coupled into the liquid jet. The laser beam is guided by the liquid jet like a beam is guided by an optical-fiber to the point where the liquid jet impinges onto the workpiece. Some of the laser energy is deposited in the workpiece material and can cause ablation, heating, chemical processes or phase changes. Ablation is the preferred process in this context. The laser beam can be a continuous (cw) or a pulsed laser Being "irradiated by the laser beam along a length-section" means that the workpiece is uninterruptedly irradiated along at least parts of a length-section.

"uninterrupted irradiation": In the case of a continuous laser, a uninterrupted irradiation starts and stops with the irradiation of the surface. In the framework of the invention, the following definition may be helpful in the case of a pulsed laser:

If there is a first laser-footprint produced by a first laser pulse at a first time, it has to have the following features in order to belong to a time interval of uninterrupted irradiation:
  a) There is a second laser-footprint produced by a second laser pulse at a second time.
  b) There are no laser pulses between the first and the second pulse, i.e. the first and the second pulse are adjacent pulses in the time coordinates.
  c) The first and the second laser footprint overlap at least partially.
  d) The motion of the liquid jet on the reference surface is such that the centre point of the liquid jet-footprint is, in the time between the first and second pulse, never outside the area covered by the first and/or second laser footprint.
  e) There is only one laser footprint in a region of uninterrupted irradiation which is only a first laser footprint and this laser footprint is the first laser footprint of the uninterrupted irradiation and
  f) There is only one laser footprint in a region of uninterrupted irradiation which is only a second laser footprint and this laser footprint is the last laser footprint of the uninterrupted irradiation.
  g) All other laser footprints are a first laser footprint for one pair of laser footprints and a second laser footprint for a second pair of laser footprints.

In other words: The laser-footprints form a laser-trace which is a continuous area in reference surface coordinates. The time coordinates of the laser-footprints are continuous in the case of a continuous laser but discrete in the case of a pulsed laser.

"part of the time frame": Something happening during "part of the time frame" means, that it happens at least during a subinterval of the time interval called "time frame" or "time frame of the process". A part of the time frame can be a short moment of the length of a single laser pulse (e.g. femto- or nano-seconds), a significant part of the time frame in the order of seconds or even minutes and, if the time frame is longer, a significant part of the time frame may even be longer. "Part of the time frame" can be a single interval or any number of time intervals. A period of uninterrupted irradiation with a pulsed laser is typically counted as being in one part of the time frame if the expression "part of the time frame" is used to specify the time interval during which irradiation is occurring.

"material is ablated": Ablation should be used in a broad sense meaning all physical and chemical processes by which material is separated from the bulk of the workpiece. Here ablation is caused by the deposition of energy by laser radiation in the surface layers of the workpiece. The ablation process caused by the laser radiation may be supported by the liquid jet (e.g. the present of the liquid can hinder redeposition and the liquid flow can remove debris).

"treatment of material": A liquid jet and a laser coupled into it can treat material in different ways. Depending on the amount of energy deposited in the material and the time during which this deposition happens, the material is heated or ablated. Heating can cause rearrangement of the crystalline structure and annealing processes. It can for example also change magnetic properties and chemical processes, possibly also involving the liquid can be triggered and/or controlled. A liquid jet with and without laser coupled into it can also be used to clean surfaces.

"overlap-area": An overlap-area is an area which occurs more than once in the trace and whereby the time coordinates are non-adjacent. The expression "area" means here an area in reference surface coordinates only. An area occurring more than once in the trace is a "common area". Two examples should clarify this definition. Assume for these examples that there are three different moments in time which occur in this order T1, T2 and T3: In the first example, there is a common area of all footprints with time coordinates between T1 and T2. This common area is overlapped or covered with footprints with time coordinates starting at T2. In this case, the common area is not an overlap-area as the time coordinates are adjacent. In the second example, there is again the common area of all footprints with time coordinates between T1 and T2. In contrast to example one, footprints with time coordinates starting at T3 share the same common area; but there are no footprints with time coordinates from the time interval between T2 and T3. In this case, there is an overlap-area as the time coordinates between T2 and T3 are missing and therefore footprints with non-adjacent times are overlapping. The different situations are also illustrated in FIG. 4d: The footprints 5 are circles and their time coordinates are labeled with letters between A and E. There are many common area like e.g. "A, B" or "A, B, D". The common area "A, B" is not an overlap-area as A and B are adjacent time coordinates. The common area "A, B, D" is an overlap-area as B and D are not adjacent time coordinates: The time coordinate C is missing. A further example is shown in FIGS. 13a, b, c and in the explanations of this Figure given later.

"gap in time coordinates": If an overlap-area exists, the involved time coordinates can be sorted into two complete intervals: A complete interval is meant to be a set which includes all elements between its boundaries. E.g. the time interval between T1 and T2 is a complete interval. In contrast, an interval between T1 and T3 that does not include T2 is not complete because T2 is between the boundaries T1 and T3 but is not part of the interval in the example. The requirement of non-adjacent time coordinated in an overlap-area means, that there is only one way of sorting the time coordinates involved in an overlap-area in two complete intervals. And this means also, that the two intervals do not share a common boundary. The smallest distance between one of the boundaries of the one interval and one of the boundaries of the other interval should be called a "gap". In other words: The gap in the time coordinates is the non-empty interval between the last time coordinate included in a set of adjacent time coordinates and the first time coordinate included in another set of adjacent time coordinates whereby all time coordinates are found in the same overlap-area. In the case of the above mentioned common area "A, B, D", the gap in time coordinates is "C" as the sets of adjacent time coordinates are in this case [A, B] and [D]. The interval boundaries are therefore A, B and D and the differences between them D-A and D-B. As D-B is smaller than D-A, the gap is everything between B and D. Because of the discrete time coordinates in this example, there is only one time coordinate inside this interval and this is C. Therefore C is the gap in time coordinates. A further example is shown in FIGS. 13a, b, c and in the explanations of this figure given later.

"associated common area": An associated common area of an overlap-area is the area common to all trace sections which are part of the overlap-area. As explained in the definition of "overlap-area", every overlap-area is also a common area. But not every common area is also an overlap-area as the criterion of non-adjacent time coordinates may not be fulfilled.

"Length-section": Length-sections of the trace are parts of the trace. They have the width of the trace and the width is the extent of the trace perpendicular to the trajectory. The perpendicularity is determined in the reference surface coordinates only and then projected back onto the trace at the time coordinate for which it was calculated. In the framework of the invention, the beginning and end of the length-section is defined by straight lines perpendicular to the trajectory, i.e. lines which could also be used to measure the width of the trace. The part of the trace between the two boundaries of the first and the second length-section, respectively, include the complete overlap-area before and after the gap, respectively, in the time coordinates while the boundaries are as close to each other as possible. Examples of different overlap-areas 14 and their length-sections together with their boundaries 12a, b and 13a, b are shown in FIGS. 4a and 4b. The difference between including and excluding the boundaries of time interval is needed to decide if only adjacent time coordinates are present in a set of time coordinates. Checking for adjacent time coordinates is important to decide if a common area is an overlap-area or not. Therefore the mathematical convention of writing an interval including the boundaries with square brackets and writing an interval excluding the boundaries with round brackets is used; an interval including one and excluding the other boundary is written with one square bracket adjacent to the included boundary and one round bracket adjacent to the excluded boundary. However the difference between including and excluding the time interval boundaries is neglected for naming length-sections: The length-section [A, B], covering a time interval which includes both boundaries, should be the same as the length-section (A, B) which excludes both boundaries from its defining time interval.

"associated first and second length-sections": A first length-section has earlier time coordinates than a second length-section. Parts of the first length-section are overlapped by parts of the second length-section. First and second length sections are associated to the overlap-area which defines their boundaries.

It is possible, that one length-section of the trace is a first length-section associated with a first overlap-area and a second length-section associated with a second overlap-area. As an example, consider a trace with a trajectory of the shape of a deformed Z with the lower right end being below the lower left edge and the upper left end being above the upper right end. This shape is given in the first-reference-surface-coordinate—time coordinate plane and the trace has a constant width extending perpendicular to this plane in the direction of the second reference surface coordinate. The time coordinate T4 is found at the upper left of the deformed Z-shape, T3 at the upper right, T2 at the lower left and T1 at the lower right.

There is a first overlap-area with a first length section [T1, T2) and a second length section (T2, T3]. The gap of this first overlap-area is the point T2.

There is a second overlap-area with a first length-section [T2, T3) and a second length-section (T3, T4] and a gap T3.

There is a third overlap-area with a first length section [T1, T2] and a second length section [T3, T4] and a gap (T2, T3).

The length-section (T2, T3) is therefore a second length section of the first overlap area and a first length-section of the second overlap area.

The length section [T1, T2) is a first length section of the first overlap-area as well as of the third overlap-area.

The length-section (T3, T4] is a second length-section of the second overlap-area as well as of the third overlap-area.

This example shows also, that it is possible that there are areas which occur more than two times in a trace. In such a case, any but the, in direction of increasing time, last length-section can be the first length-section and any length-section with time coordinates later than the one of the first length-section can be the second length-section.

"parallel"/"parallel-shifted": In the framework of the invention "parallel" is not only applicable to straight lines but also to curves. "Parallel lines" are defined as follows: The distance between two lines, measured perpendicular to the local tangent of one of the lines, starting from this line, is constant. In a curve, this definition results is two different curvature radii for the parallel lines. On straight lines, it is equivalent to the mathematical definition of parallel straight lines. One way of constructing curved parallel lines according to this definition in a simple way can be explained with reference to FIG. 11: There is a first curve 30.1. A second curve 30.2 should be constructed which is parallel-shifted by a constant distance 31. In order to do this, circles with a radius of the constant distance 31 are used. The circles are placed with their centre points on the first curve 30.1. The outer boundary of the envelope of all these circles on the one side of the first curve 30.1 is the parallel-shifted second curve 30.2. "Parallel shifted" lines are "being parallel" and vice versa. The lines are the centre-lines of the length-sections in this case. The amount of parallel shift is the distance between the two lines, measured as described above in the definition of "parallel".

"Contacting region" is preferably understood as a region with a boundary which is partially shared with the boundary of another region. There is, therefore, a spatial contact between the two regions.

"oversize region": This is a region in the trace-area with a minimal extent that is greater than twice the largest diameter of the liquid jet-footprint occurring at the measurement position.

Preferably, an overlap-area needs to fulfill an additional, third criterion which is that the centre-lines of the associated first and a second length-section are unintersected by each other. "Unintersected" means that the centre-lines do not cross. This means that a common area of a trace with non-adjacent time coordinates is preferably not an overlap-area if the centre-lines of the two length-sections cross within the common area. "crossing" or "intersecting" is preferable an intended and significant crossing. If the maximum distance on between the centre-lines on only one side of one of the centre-lines is less or equal the amount of inaccuracy in the process due to the controls and devices involved, this should be considered as being unintersected resp. as not being a crossing. FIG. 4c shows some examples of areas which are overlap-areas according to the less strict definition but not according to this preferred definition. These are the areas 14.2 and 14.3. The overlap-area 14.1 is an overlap-area fulfilling all three criterions.

In a preferred embodiment, the laser beam irradiates the workpiece along both length-sections.

As the material is ablated only due to the laser radiation, irradiation along both length-sections allows faster material removal or material treatment.

Irradiation along a length-section is preferentially understood as an uninterrupted irradiation being present during at least a part of the time interval associated with the length-section.

In a further embodiment, "irradiation along a length-section" means an uninterrupted irradiation along the complete length-section. This means that the uninterrupted irradiation occurs during the whole time between the boundaries of the first length-section associated with an overlap-area and again during the whole time between the boundaries of the second length-section associated with the same overlap-area.

In another embodiment, there is a uninterrupted irradiation only along the complete first length-section or along the complete second length-section associated to the same overlap-area.

In another embodiment, there is a uninterrupted irradiation along the complete time interval of one of the length-sections and a uninterrupted irradiation along at least a part of the time interval of the other length-section.

In a further preferred embodiment, the laser irradiates the workpiece uninterruptedly in the time frame.

This means, that the laser irradiated the workpiece during the whole process.

A uninterrupted irradiation increases the speed of the process and avoids the controls and devices needed to couple the laser into and out of the liquid jet or to switch the laser on and off.

In a preferred embodiment, at least one of the associated first and second length-sections of the associated overlap-area is substantially completely covered by the associated overlap-area.

In other words: Either the first length-section covers the second length-section completely or the other way around.

If the shape and size of the liquid-jet footprint does not change, the two length-sections have substantially the same shape. In this case, the overlap-area has substantially the same shape as the two length-sections.

In this embodiment, the centre-line of the first length-section is substantially identical to the centre-line of the second length-section. This minimizes the width of the kerf produced by ablating material.

In another preferred embodiment and as an alternative to the one presented above, the overlap-area can be smaller than a trace-area of any one of the length-sections.

The trace has a certain width. The length of an overlap-area and the length of its associated length sections are per definition in most cases substantially the same. (A significant length difference is e.g. possible in narrow turns of the centre-line). However, independent of the shape of the centre-line, the width of the overlap-area can be smaller than the width of any one of the length-sections of the trace. This is the case if the centre-lines of the first and second length-section are in some distance from each other and only the sides of the length-sections overlap. In these cases the overlap-area is smaller than the trace-area of any one of the length-sections. Such a case is for example shown in FIGS. 4a and 4b where the overlap-areas 14 are smaller than both length-sections with are the sections of the trace between the boundaries 12a and 12b resp. 13a and 13b.

It is possible, and depending on the material and the properties of the edge, desirable to choose the path of the liquid jet such that the trace overlaps itself on one side but not on the whole width.

In a preferred embodiment, the trace has in a sequence a first advance-segment, a return-segment and a second advance-segment, wherein a) the first advance-segment and the return-segment are the first and second length-sections of a first overlap-area and b) the return-segment and the second advance-segment are the first and second length-section of a second overlap-area and c) a common area of the first and the second overlap-area is essentially superposable with at least one of these two overlap-areas.

"superposable" is the adjective to "to superpose" which is defined as "to lay (as a geometric figure) upon another so as to make all like parts coincide" (Merriam-Webster, via website).

Essentially, the just described embodiment is a strategy in which one moves forward, backward and forward again along the same centre-line. However it is possible to realize the first advance-segment, the return-segment and the second advance segment with small displacements and/or deformation in the centre-line from step to step while still having the common area of feature c) if the size or shape of the footprints changes or varies during the process. The amount of such displacements and/or deformations which is possible is determined by the changes in size and/or shape of the involved footprints.

For example, assume that the first advance segment is [T1, T2 and, the return segment is (T2, T3] are associated with the first overlap area O1. The return segment [T2, T3) and the second advance segment (T3, T4] are associated with the second overlap area O2. This is essentially the "distorted Z-shape" example discussed above in the context of the definition of length-sections. Thinking of the Z-shape, it is clear that the overlap areas O1 and O2 have a common area which is equal to the trace area of (T1, T2) which is equal to the trace area of (T2, T3) and equal to the trace-area of (T3, T4). Discussing lengths and areas of traces, trajectories, centre-lines and trace-areas, the difference between an interval including a boundary and excluding it, is not present. Therefore the common area of O1 and O2 equals the area of O1 as well as the area of O2.

Note, that it is consistent with the definition of "length section" given above, that e.g. (T2, T3] and [T2, T3) are the same length-section and have the same name "return segment".

In a second example, assume that the width of the trace decreases with time, but the trajectory is the same as in the previous example (distorted Z-shape). Both overlap areas O1 and O2 occur with the same associated length sections. However, O2 is smaller than O1 because the trace is less wide at the later time. O1 has the width of the trace-area (T2, T3] and O2 hat the width of the trace-area (T3, T4]. The common area of O1 and O2 has now the shape and size of the trace-area (T3, T4] which is the smallest of all involved trace-areas and which equals O2. Therefore, there is still one overlap-area (O2) which is superposable with the common area of O1 and O2. This second example is shown in FIG. 5b were the first advance segment 15 is [T1, T2), the return segment 16 is (T2, T3] and the second advance segment 17 is (T3, T4].

In a third example one may shift the trajectory in such a way in the second reference surface coordinate direction, that one side of the trace keeps a constant value of the second reference surface coordinate. Obviously, there are still the overlap-areas O1 and O2 and as in the second example, their common area is equal to O2. However, the centre-lines of the different sections are displaced with respect to each other.

The common area of the first and second overlap-area occurs at least three times in the trace: Once in the first advance-segment, once in the return-segment and once in the second advance-segment. This is inevitable as the common area of O1 and O2 includes only areas which are occurring in O1 and O2. O1 includes only areas which are part of the first advance-segment and the return-segment. O2 includes only areas which are part of the return-segment and the second advance-segment. Therefore, the common area has to be a part of the first advance-segment as well as part of the return-segment, as well as part of the second advance-segment. All these three parts have the same spatial coordinates. However, they do differ in their time coordinates.

A process according to this embodiment is called "progressive cutting".

In a preferred embodiment, the workpiece is not irradiated by the laser beam in the return-segment of the progressive cutting process.

"not irradiated in the return-segment" may be understood as follows: there is no irradiation at any time in the whole time interval defined by the return-segment. As explained above, the return segment is a first length section associated with the second overlap-area and a second length-section associated with the first overlap-area. It follows from the basic concept of the invention that in the case of no irradiation in the return-segment, there is irradiation onto the workpiece in the first and second advance-segments.

In another embodiment, "not irradiated in the return-segment" can be understood as that there is no uninterrupted irradiation during the complete time interval defined by the return-segment. In this case there is the possibility that there is no irradiation onto the workpiece in the first and second advance-segments because in this case, the irradiation during parts of the time interval of the return-segment is sufficient to making it possible fulfill the basic features of the invention.

In an alternative preferred embodiment, the workpiece is irradiated by the laser beam in the return-segment of the progressive cutting process.

In this case, there is the possibility that there is no irradiation onto the workpiece in the first and second advance-segments. Preferably however, the workpiece is irradiated by the laser beam in all segments: the first advance segment, the return segment and the second advance segment.

In a preferred embodiment of the progressive cutting, there is a third advance-segment which is a length-section added at the end of the sequence. Preferably, the length of the third advance-segment is not longer than the length of the return-segment.

With the third advance-segment, the trace-area grows with time in direction of the third advance-segments if this process is repeated over and over again. Preferably the lengths of the third advance-segment and the return-segment are the same in all repetitions.

Because the first advance-segment is a first length-section of the overlap-area with the return-segment, the first advance-segment has the same length as the return-segment. The second advance-segment is the second length-section of the overlap-area with the return-segment and therefore it has also the length of the return-segment. The progressive cutting as defined above stays therefore in a region of the length of the return-segment. The third advance-segment changes this. Its length determines the amount by which the trace-area increases in length with every repetition of the progressive cutting mode. If the length of the third advance-segment is not longer than the length of the return-segment, the number of overlapping trace sections on the area covered by the progressive cutting is constant after an initial phase. This makes it possible to produce an elongated cut with constant depth by using constant laser irradiation during each section (e.g. the laser is either uninterruptedly irradiation along the return-segment or not irradiation along the return-segment at all).

In another embodiment, the first and second length-section are substantially parallel along at least part of the length in which they form the overlap-area. Preferably, the centre-lines associated with these parts of the length-sections are parallel shifted. More preferably the centre-lines are parallel shifted by substantially a value between 0.1 to 0.9 times the diameter of the nozzle exit, most preferably by substantially a value between 0.3 to 0.7 times the diameter of the nozzle exit.

A process according to this embodiment is called "parallel cutting".

Two length-sections are substantially parallel to each other if their centre-lines are substantially parallel.

If the amount of parallel shift is 0, the two centre-lines are on top of each other and one of the two length-sections overlaps the other substantially completely.

The liquid jet has a diameter of about a nozzle exit diameter. Assuming that the liquid-jet is produced by a round nozzle and that it impinges perpendicularly on the reference surface, the footprint will be substantially circular with a diameter about of the size of one nozzle exit diameter. A parallel shift of 0.1 to 0.9 times the nozzle exit diameter results in an overlap-area of the two length-sections covering only part of the trace-area of any one of the length-sections. This amount of parallel shift is chosen such that the characteristics of an overlap-area being smaller than both associated length-sections, is preserved even if there was little knowledge about the surface of the workpiece used during planning the process. In the interval between 0.3 and 0.7 times the nozzle exit diameter, the amount of overlap and the overlap-area are such that a preferred kerf can be produced in a reasonable time.

An example of this process is shown in FIG. 5a: The trajectory 9 is shown in its projection on the reference surface and per definition, the trajectory 9 and the centre-line 11 look alike. The two shown length sections, one between the boundaries 12a and 12b and the other between the boundaries 13a and b, have parallel shifted centre-lines and the amount of parallel shift is about 0.75 times the nozzle exit diameter.

In one further embodiment, there is a region in the trace-area which has a minimal extent greater than twice the diameter of the liquid jet footprint. This region is called oversize region. Both extents, the one of the trace area and the one of the liquid jet-footprint, are measured in the reference surface in a direction perpendicular to the centre-line of the trace.

The diameter of the liquid jet-footprint is measured at the place of the oversize region. This region will include more than one liquid jet-footprint, and the extent of the liquid jet-footprint is the largest of the extents of all liquid jet-footprints being in the oversize region.

The center line of the trace will have a certain length. All parts of the center line which show the feature stated above define one or more oversize regions: In the context of the invention, it is a single oversize region, if the regions with sufficient trace-area are connected between each other. However, a connection of an extent smaller than twice the diameter of the liquid jet-footprints is not sufficient and in this case, in the context of this invention, it is defined that there are two or more separated oversize regions.

One embodiment of a process is characterized in that the centre-line of the trace has at least in part a spiral-like character. Preferably, the centre-line of the trace has at least in part a spiral-like character if the trace includes an oversize region.

A line with a spiral-like character can be constructed as follows (see also FIG. 5c): One chooses a centre point 19 and a starting point 20. Further a reference line 21 is defined as the line passing the centre point and the starting point. There is a well defined distance between the centre point and any point, called radius 22.1 here. Further an angle 22.2 between the reference line and a line passing through the centre point and any other point can be determined. This angle is 0° for the starting point 20. All points on the resulting curve, having an angle of 0° or 360° will be called "i-th starting point" with i being an integer. For a spiral-like character, a curve is constructed: It starts at the starting point 20 and all of its following points have, in the order they appear, either an increasing or a decreasing angle with respect to the reference line (in FIG. 5c indicated by the arrow of the angle 22.2). The radii can, but do not need to change from point to point. The i-th starting point defines the beginning of the next round and the end of the previous round. If the radius of the i-th starting point is smaller than the radius of the (i−1)-th starting point, all radii of the points in the next round should be smaller than the radii of the point with the same angle in the previous round. This applies vice-versa for the radius of the i-th starting point being larger than the radius of the (i−1)-th starting point.

However, if there is a change from a decreasing to an increasing spiral or vice versa, there is one point behind or at an i-th stating point which has a radius larger resp. smaller than the radius of the point with the same angle in the (i−1)th round. In FIG. 5c this change is indicated by the change from a solid to a dashed line. In FIG. 5c the changing point is one of the starting points. All points following this changing point will then be larger resp. smaller than the radius of the point with the same angle in the previous round for a significant part of the round, preferentially at least one complete round or at least one half of a round.

For a spiral like-character only one complete round needs to be present.

While the spiral-like character as defined above allows a different shape of each round, in a preferred embodiment, the shape is the same in each round but scaled. I.e. the radius of each point is the initial radius multiplied with a factor greater than 0 which is constant in one round but different in each round. In another embodiment, the radius of each point is its initial radius multiplied with a factor which increases or decreases steadily from point to point. The initial radius of a point is in both cases the radius of the point with the same angle in the first round. In a preferred embodiment the factor, in any one of the two embodiments including the factor, decreases first to zero and increases then so that the final desired size of the shape is reached decreases afterwards again until it reaches 1. Alternatively, the factor increases so that the final desired size of the shape is reached, decreases then to 0 and increases again to 1.

In a preferred embodiment the initial radius of the points increases or decreases steadily following the appearance of the points. This results in the typical round spiral shape.

In another embodiment, the progressive cutting is applied for ablating material in a break-through area where the material thickness is a) either less than ¼ of the material thickness at this position before any material was removed b) or the material thickness is less than 200 µm, preferentially less than 100 µm.

Preferentially, the material thickness is determined by means of a depth measurement device.

A break-through area is an area where the material to be processed is completely removed, i.e. the liquid jet will break through the material after a certain time. The removal of the last bit of material is critical for the quality of the edges. Therefore, the use of the progressive cutting shortly before the break-though improves the edge quality.

The material thickness can be determined in different ways: One possibility is to simply count the number of passes with irradiation at every position and to assume either from theory or from experiments and experience the ablation depth of every pass. Instead of counting, the process can be planed in advanced to pass a certain position a defined number of times. But it is also possible that the remaining thickness is measured directly. A measurement laser can be coupled into the liquid jet, too and its reflections can be analyzed to measure to distance from nozzle to workpiece surface. Similar measurements can be done with the machining laser, as part of the irradiated light will be reflected back. But the measurement can also be done by a device independent of the liquid jet guided laser, e.g. by a mechanical measuring sensor, by optical systems like e.g. a camera, by ultra-sound technology, by systems using other wavelength from the electromagnetic spectra and any other depth or thickness measurement technology know to a person skilled in the art. If a depth or a distance is measured, the initial height of the workpiece at this position will be measured and stored so that the remaining thickness can be calculated by the depth measurement device or by another internal or external computation unit.

In another preferred embodiment, after a break-through, the trace has a length-section with a centre-line which is substantially parallel shifted in direction of a desired high quality edge of a workpiece with respect to the spatial coordinates of the centre-line of the length-sections used in the break-through process. The parallel shift is preferably done by an amount of about 20 μm.

Preferentially, the workpiece is irradiated by the laser coupled into the liquid jet along this length-section with the parallel shifted centre-line.

This embodiment improves the edge quality and is called "finishing pass".

In a further preferred embodiment the centre-line and the trajectory of the parallel shifted length-section have the same length in reference surface coordinates.

In a preferred embodiment, an impinging angle determined between the liquid jet and a normal vector to the reference surface is greater than 0°, preferably between 10° and 80°, especially preferably between 30° and 60°, especially substantially at 30°, 45° or 65°.

The impinging angle can be changed by tilting the workpiece, the nozzle or the nozzle including device (machining head) or any combination of them.

A different impinging angle changes the shape and size of the liquid jet-footprint and, therefore, also of the laser-footprint. Slightly different portions of the material are irradiated by the laser and this can influence the ablation process. If the angle is too large, the laser footprint is too large and the deposited energy may not cause the desired ablation of material. If it is too small, there is no difference to the not tilted embodiment. However, these effects may be desired by some applications, e.g. for regulating the amount of energy received by the surface. It is e.g. well known that the quality of semiconductors can be improved by heating (annealing) or that local heating of a material can relax internal stresses. A tilted liquid jet guided laser beam could provide such a local heating.

In another preferred embodiment, one or more of the following parameters are changed within the time frame:
a) the impinging angle,
b) space coordinates of the centre-line,
c) a speed of displacement,
d) laser parameters.

It may happen that a portion of the material is difficult to remove. In these cases, changing one or more of the above listed parameters can change the reaction of the material portion to the irradiated energy. Also small changes in these parameters may improve the accuracy of the process. Sometimes, one may also wish to produce an edge with properties controlled by these parameters. It is for example possible to control the angle of the edge or if it is round or sharp by the choice and control of the impinging angle. Fuzzy space coordinates of the centre-line can produce an irregular edge line which may be favorable if coatings or adhesives should be applied to the edge at a later stage. The speed of displacement can influence the size of the zone in the material which is influenced by heating. Depending on the material, heating changes the material properties and therefore also the edge properties. Laser parameters determine also how efficient the material is ablated and how much heat is produced. Therefore they can have also an influence on the edge material properties.

Changing the impinging angle is discussed above and applies here as well.

The space coordinates of the centre-line can be changed by shifting nozzle and workpiece, and thereby the reference surface, with respect to each other. Depending of the axis of rotation, the shift can be caused by tilting nozzle, the nozzle holding device and/or the workpiece.

The displacement is caused by any of the motions listed in the previous paragraph. By changing the speed of these motions, the speed of displacement changes and can be controlled.

Laser parameters can be controlled either at the laser itself or in one or more optic setups later in the optical path. Preferably, they are located between the laser source and the position where the laser is coupled into the liquid jet. However, also the composition and the properties of the liquid can be used to change laser parameters. The wavelength can e.g. be changed by inserting a suitable material in the optical path, filters can change the intensity of the laser radiation and e.g. a chopper wheel or flipping mirror can change the frequency. Other suitable optical elements are well known to a person skilled in the art.

In another preferred embodiment, the trace-area is divided into at least two regions of different size, namely one large region and at least one smaller connecting region. The large region is an oversize region as defined above and the process used in this region includes a trace with a centre-line having a spiral-like character. The smaller region is processed with the processing strategy according to the invention or any one of its embodiments.

In a preferred embodiment, any steps of the previously described process and its embodiments are applied more than once on the same trace-area. Preferentially, the executed embodiment changes after being applied once or several times.

Many embodiments can be applied onto one workpiece and even in the same area. This can allow finding a balance between processing speed and edge quality. Changing the applied embodiment can also be used to realize special edge shapes like e.g. the amount of chamfer.

In a preferred embodiment, a first and a second process are applied to a front side and a backside, respectively, of the workpiece. The trace-area of the first process and the trace-area of the second process are superposable.

This embodiment allows shifting the break-trough region away from the front- or backside of the workpiece to a depth region somewhere in between the front and backside. This can be an advantage as the thin material in the break-through region is all the time supported from the top and from the bottom by being connected to the sides of the break-through region.

This embodiment can be realized for example by either turning the workpiece or the nozzle holding device or both such that the liquid jet reaches the backside of the workpiece. Preferentially, the nozzle is turned around an axis which fulfills the following condition: the y-direction is along the shortest distance from the workpiece to the nozzle. The x-direction is perpendicular to the y-direction. The nozzle is located at $x_N=0$ and $y_N$, therefore the workpiece is located at $(x_W, 0)$. Then possible rotation axis are perpendicular to the x- and the y-direction and include the point $(x_M, y_M)$ whereby $y_M < x_M^2/(2\ y_N) + y_N/2$. The choice of the possible rotation axis is further restricted by the condition that there should be no collision between the nozzle and the workpiece and other parts of the surrounding device. Preferentially, the workpiece is turned around an axis which fulfills the following condition: The coordinate system should be defined as before. Assume further that $x_W=0$. Then possible rotation axis are perpendicular to the x- and the y-direction and include the point $(x_M, y_M)$ whereby $y_M < x_M^2/(-2\ y_N) + y_N/2$. The choice of the possible rotation axis is further restricted by the condition that there should be no collision between the nozzle and the workpiece and other parts of the surrounding device. If both, nozzle and workpiece, are turned the choice of possible rotation axis is less restrictive and it may be easier to avoid collisions. A turning can also happen together with a number of translational motions: It is e.g. possible to drive the workpiece away from the nozzle along the above defined x-direction, to turn it around any of the above specified axis (note that the rotation axis has to be translated, too) and to move the workpiece back to the nozzle along the negative x-direction. Similar motions can be done with the nozzle. Also more than one rotational motion can be combined.

The invention is also directed to a computerized numerical control (CNC) program for controlling a liquid jet guided laser machining device, wherein the program is designed for performing a process as defined above and/or any of its embodiments.

The liquid jet machining device may include a computer interface to receive control signals for motions, laser parameters and the times for switching the liquid jet on and off as well as when to couple the laser into the liquid jet. These control signals can be generated by a CNC program which causes the liquid jet machining device to perform the inventive process or any one of its embodiments.

The CNC program can be combined directly with the machine or it can be a stand-alone program which can be executed on different platforms like personal computers, servers, specialized computers, networks or combination of them. Different task can be performed on different platforms: It is for example possible to perform all needed computations on a personal computer and to receive a list of commands for different control signals. This list is then transferred to a control unit of the liquid jet machining device which simply generates the control signals based on the list of commands.

A liquid jet machining device comprises a machining head with the liquid jet nozzle and a laser coupling unit. Preferably the liquid jet machining device additionally comprises a workpiece-holder. Preferably the liquid jet machining device comprises means for moving, linearly displacing and/or rotating and/or tilting the nozzle with respect to a workpiece and/or means for moving, linearly displacing and/or rotating and/or tilting the workpiece with respect to the nozzle.

However, the workpiece-holder can also be an external device, independent of the liquid jet machining device. The workpiece-holder can also be an external device which can be coupled or connected to the liquid jet machining device in any mechanical or electrical or purely signal-transmitting way. For very large and heavy workpieces for example, a workpiece-holder can be completely omitted.

Means for moving or rotating or tilting can be all kinds of well known actuators or motors. It is however also possible that some motions are manually effected like e.g. changing a tilting angle by manually turning a screw or to turn the laser on or off manually. An optical or acoustical signal can be a control signal given by the CNC program in this case. Further possibilities to create a controlled motion are e.g. the use of thermal expansion of a connecting rod or the use of electromagnetic fields.

There is a computer readable storage medium containing the computerized numerical control (CNC) program.

Such a computer readable storage medium can be for example a hard disc, a flash memory, a memory stick, a CD, a DVD, a floppy disc, a magnetic tape, a batch, a print on paper or another carrier which can be read by a device connectable to a computer and any other possible storage medium. The location of the storage medium is arbitrary: it can be close to the user or on the other side of the world. It can be accessible by a direct and private line, via a network or via the world-wide-web. It does not play a role how the data is transmitted: if electronically, optically, by mail, radio transmission or on any other way.

In a preferred embodiment, the CNC program comprises a data transfer interface to a computer program which calculates the trajectory of the trace based on a workpiece shape desired by a user and preferably a choice of at least one embodiment of the process.

The CNC program and the computer program can be two different programs running on different systems and/or at different times. The data transfer interface can be a suitable cable, a wireless connection or a storage device which can be transferred between the CNC and the computer program. It is however also possible, that the computer program has basically the characteristics of a module of the CNC program and in such a case, the data transfer interface is realized by the logic of the CNC resp. the computer program. For the user, it will be difficult or even impossible to see the separation between CNC- and computer program.

Regarding platforms and execution possibilities, that same options apply as mentioned above for the CNC program.

If the liquid jet footprint is point-like, i.e. very small, the trajectory substantially coincides with the trace. Based on
   the known shape of the liquid jet-footprint,
   the embodiments of the process to be used,
   the shape of the workpiece before machining with the liquid jet guided laser and
   the desired shape to be reached by machining,
   the computer program can calculate the optimal trajectory. The trajectory determines, together with at least one of the parameters given above, the trace. Once the time intervals in which the laser is coupled into the liquid jet and the trajectory are known, the times and positions at which the workpiece is irradiated result. Because the irradiation causes the ablation, the amount and the places where material is ablated are given. The choice of the process determines the way the edges look like in the end. The desired shape determines where the edges are.

There is further a computer program for generating the computerized numerical control (CNC) program, wherein the computer program provides at least one of the following steps or functions:
   a) input for defining a trace,
   b) input for defining a trajectory,
   c) input for defining a trace-area,
   d) input for a desired shape of a workpiece,
   e) input for desired edge properties,
   f) input for workpiece information, preferentially the workpiece material and/or the initial shape of the workpiece,
   g) finding a suitable trace based on an inputted trace-area or a desired shape of a workpiece,
   h) selecting a segment of the trace,
   i) proposing or determining one or more of the processes according to any of claims 1 to 11 based at least partially on the material of the workpiece and/or desired edge properties,
   j) assigning a process to the selected segment,
   k) determining a trajectory which will produce a given trace,
   l) generating a computerized numerical control (CNC) program suitable for implementing the process strategy in the selected segment, There is further preferably a human-machine-interface program (HMI) which executes the CNC program on the machine and preferably provides at least one of the following steps or functions:
  a) executing the CNC program,
  b) observing the execution of the CNC program,
  c) adapting the process and laser parameters, preferentially based on observations and/or measurements,
  d) giving out alerts and/or notifications when problems are encountered or predefined steps were successful executed.

The input for defining a trace can be any sort of user or computer interface. It can be for example a graphical user interface where the user specifies the trace by drawing it or by entering a list of points or a list of geometric objects at different positions. Another possibility is that the trace-area is drawn on an image of the workpiece or on the workpiece itself and that a scanner is used as input device to digitalize this information. The user can add the time information later. However, the trace could also be defined by tracking the motions of the user or a device. Traces can be saved on a computer readable medium and they can be imported from a computer readable medium. A trace can be defined by its trajectory and footprints. Typical footprints can be stored and accessed by the computer program.

An input for defining a trajectory or a trace-area can be constructed very similar to the input defining a trace. However, as both, the trajectory and the trace-area include less information than the trace, the interface can be simpler: In the case of the trajectory the footprint information is not specified by the user. In the case of a trace-area input, the time information is not needed. The respective input channels for these parameters can be omitted compared to the input for defining a trace.

Preferably, the input for defining a trace, a trajectory or a trace-area are connected such that the program realizes what kind of input it has receives and either completes the necessary information from a database or a storage or it guides to user to provide the necessary information. Preferably, the user can choose which data should be completed based on stored data, which data should be produced numerically and which data will be provided by the user.

There is also the possibility that the user inputs only the desired shape of the workpiece. The input can again happen in any of the above mentioned ways. The program calculates then, either assuming or measuring or asking the user for information on the current shape of the workpiece, a suitable trace-area to produce the desired shape of the workpiece. Together with the trace area, an ablation depth can be calculated by the program.

Together with specifying the desired shape of the workpiece or the trace-area, the user can enter desired edge properties. Such edge properties can be e.g. an angle with respect to the workpiece surface, the maximum amount of chipping, if and how edges are rounded or chamfered, if and how the workpiece should be treated by heating or cooling or the influence of the liquid. The specified edges properties can be used by the program to set or to suggest laser and liquid jet parameters (like e.g. the laser pulse rate, laser energy, laser radiation frequency, pressure of the liquid jet, composition or the liquid, and so on) as well as a specific embodiment of the process or a series of different embodiments.

If workpiece information are given and preferentially also desires edge properties, the process, laser and liquid jet parameters can be suggested or set by the program even better. This is especially helpful if the parameters and the embodiments of the process changes during the process. The program can, independent of the given information, divide the trace in several sections and ask either the user to specify all or some parameters and embodiments of the process on all or some of these sections and/or determine at least some of the laser and liquid jet parameters and/or embodiments of the process itself.

The computer program can either determine the embodiment of the process without asking for feedback from the user or it can present the user a list or a graphical representation of the preferred embodiment of the process and wait for the user to make the final decision for one of the embodiments.

Delegating, at least partially, the decision for an embodiment of process to the computer program makes it easier for the user as little knowledge is needed about the effects of the different embodiments of the process. Instead of choosing the embodiment of the process himself, the user enters the desired edge properties or the known material. This specifies the situation and influences the choice of the embodiment. The material can be one important factor as the amount of ablated material at given processing conditions depends on it. Further, the risk of e.g. edge chipping is higher for some materials compared to others. By using e.g. progressive cutting in the break-through area for the last passes before break-though, chipping can be reduced for some of these materials.

Edge properties can be for example the chamfer of the edge and its shape in general, the amount of chipping, the angle between the workpiece surface and the edge, the width of the kerf, symmetry of the kerf, etc.

Once a trajectory and the laser and liquid jet parameters are known, as well as the times when the laser should be coupled into the liquid jet, a CNC program can be generated. This should be simply a list of commands to the different motor, actuator, pumps, laser, optical elements and so on which can be controlled electronically ("controlled sub-devices") in a liquid jet guided laser device.

The execution of the CNC program is in many cases controlled and done by a human-machine-interface (HMI) program. This is typically integrated into the machine or into a computer coupled to the machine. The HMI program can preferably execute the CNC program and observe this observation by a number of suitable and well known sensors. Further, it can preferably adapt the process and laser parameters e.g. based on observations and measurements. Finally, the HMI can preferably give out alerts and/or notifications when problems are encountered and/or predefined steps where successfully executed.

The execution of the CNC program can be observed in different ways: On the one hand, the controlled sub-devices can return house-keeping and status signals or warnings and these signals can be observed. However it is also possible to integrate further measurement device like camera, measurement lasers, position indicators etc. The output of these measurement devices can also be monitored and analyzed by the computer program.

If such an analysis or a single signal indicated that there is a problem with the planned trajectory or laser and liquid jet parameters, the program can either warn or notify the user or change something about the trajectory or the parameters, or both (warning and changing).

A liquid jet guided laser machining device comprises a nozzle for generating a liquid jet, a laser beam generating device and a coupling device for coupling the laser beam into the liquid jet, a workpiece-holder for fixing the workpiece and a displacement drive for effecting a displacement between the liquid jet and the workpiece. A controller unit controls the displacement drive to perform the process and/or any of its embodiments as described above. Preferably the controller unit receives the CNC program or generates the CNC program itself.

The laser beam generating device can be any common of-the-shelf laser source with the desired properties or it can be a customized laser source. The coupling device can be an optical system which focuses the laser beam into the liquid jet. The workpiece-holder should hold the workpiece securely. Its construction can depend on the dimensions of typical workpieces and on their properties. The displacement drive can effect the displacement in different ways. It is e.g. possible to move the nozzle producing the liquid jet and to fix the workpiece or the move the workpiece and to keep the nozzle producing the liquid jet at a fixed position. Further, either the workpiece or the nozzle can be tilted. It is also possible that a plurality of these motions occurs at the same time. Another possibility is that the shape of the liquid jet is changed, e.g. by electromagnetic forces acting on a suitable fluid or by blowing it in a direction or by using gravitational forces by tilting the complete assembly. Therefore the displacement drive can comprise a motor, an actuator, a hand driven mechanical system or some electromagnetic field generating element.

The controller unit controls the displacement drive either by signals transferred directly to the displacement drive or indirectly by signals transferred to an intermediate part. The controller unit includes or interacts with the CNC-program. Such an intermediate part could be for example a power supply, a second controller or a human being.

In a preferred embodiment, the liquid jet machining device comprises a device monitoring the amount of ablated material and/or the remaining thickness of the workpiece.

Different possibilities of how to monitor the remaining thickness of the workpiece and, thereby, also the amount of locally ablated material were discussed above. Typical monitoring devices can be: a counter, an analyzing unit for reflected light which analyzes either light of a measurement laser or light of the machining laser, a mechanical measuring sensor which e.g. follows the local surface, an optical observation system like a camera probably coupled with a suitable illumination system, an ultra-sound or X-ray system, or a system using another part of the electromagnetic spectrum working either passive (i.e. only observation) or active (i.e. illuminating the workpiece or the surrounding or making it emit radiation at a desired wavelength).

In another preferred embodiment, the liquid jet machining device comprises a diaphragm between the workpiece-holder and the nozzle such that impacts of backscattered material on the nozzle are minimized during the processes or any of its above explained embodiments.

The diaphragm can be a simple plate with a hole only slightly lager than the liquid jet. While the liquid jet and the laser coupled into it can pass unhindered through this hole, the process and any of its embodiments can be realized as before. However, ablated material which scatters back flies not directly into the liquid jet but around it. This material hits the diaphragm and cannot reach the nozzle region. Diaphragms and their use in liquid jet machining devices are also known from WO 2010/057 328 A, but nor for their use in the above described processes.

A diaphragm can be produced, preferentially, by placing a thin plate of a suitable material at a fixed place with respect to the nozzle below it. If the liquid-jet guided laser is switched on, it will ablate the material of the plate until break-though. This plate with the hole can then be used as diaphragm. Alternatively, a hole can be drilled into a suitable thin plate or the plate can be produced with a suitable hole. There are further methods known by a person skilled in the art.

A diaphragm can be used to measure the liquid jet-footprint if it is placed in the reference surface. If it is known from theory or experiments or experience, that the liquid jet-footprint equals the hole produced in the plate by the laser beam coupled into the liquid jet, the hole of the diaphragm is directly a measurement of the footprint. If the liquid jet-footprint does not equal the hole produced in the plate by the laser beam coupled into the liquid jet, the diaphragm can be moved by small amounts in the reference surface and the positions where the liquid jet collides with the edges of the diaphragm can be recorded. In this way, the shape of the liquid jet-footprint can determined.

Further preferred embodiments result from the following description of the drawings and the totality of the claims as well as from combinations of features of the invention.

BRIEF DESCRIPTION OF THE DRAWINGS

The following figures illustrate different exemplary embodiments.

In all figures, the same parts are labelled with the same numbers.

PREFERRED EMBODIMENTS

Figure 1:
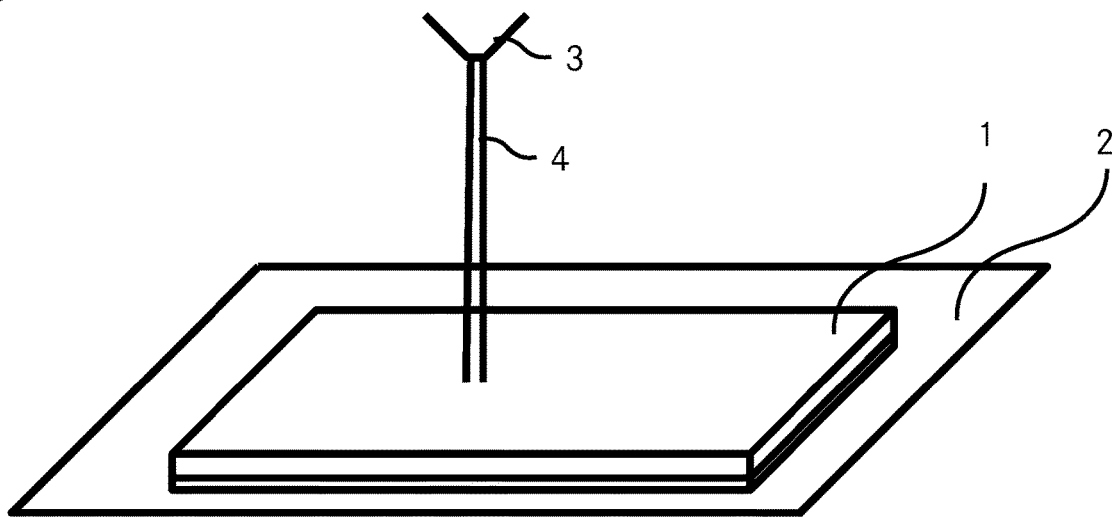
FIG. 1 The general set up with workpiece, reference surface and liquid jet and its nozzle.

FIG. 1 shows the general setup. There is a workpiece 1 and a liquid jet nozzle 3. A liquid jet 4 is produced by the nozzle 3 and impinges on the workpiece 1. There is further a reference surface 2 which is fixed to the workpiece 1 and which keeps its position with respect to the workpiece 1 during the whole process. In FIG. 1 the reference surface 2 is placed in the middle of the workpiece 1. As the workpiece 1 will change its shape during the machining process, the workpiece 1 may change its form such that the reference surface 2 is above the processed workpiece surface.

Figure 2A:
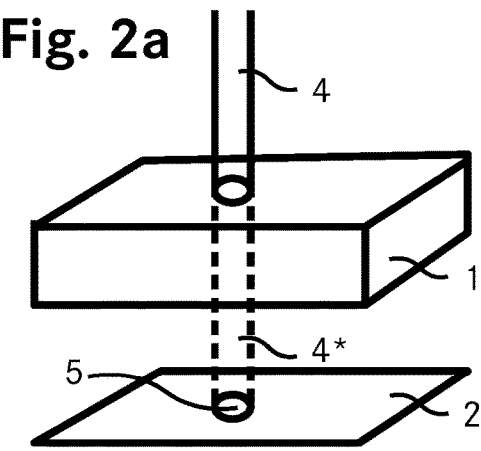
FIG. 2a, b, c The liquid jet footprint and examples.

FIG. 2a shows how the liquid jet footprint 5 is defined: It is the intersection between the liquid jet 4 and the reference surface 2. However, the reference surface 2 can be at a position where the liquid jet 4 does not exist anymore, for example because the workpiece 1 is between the nozzle 3 and the reference surface 2. In theses cases, the liquid jet 4 is extrapolated forming thereby an extrapolated liquid jet 4*.

The liquid jet footprint 5 is in these cases the intersection between the extrapolated liquid jet 4\* and the reference surface 2.

Figure 2B:
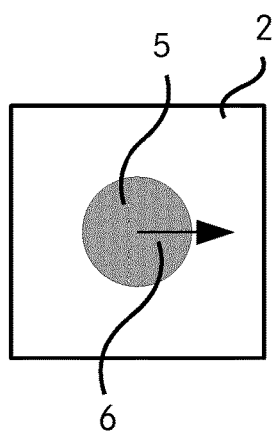
Figure 2C:
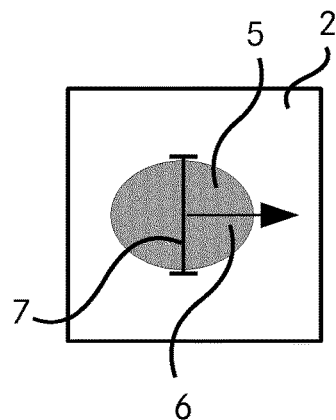

FIGS. 2*b* and 2*c* show two examples of liquid jet footprints 5 on a reference surface 2. The liquid jet footprint 5 can be substantially circular as shown in FIG. 2*b* when the jet 4 impinges perpendicular onto the reference surface and has initially a circular cross-section. If the liquid jet 4 impinges not perpendicular onto the reference surface, an elliptical shape of the footprint is possible as shown in FIG. 2*c*. During the process, there will be in most cases a second footprint following in time after the first footprint at a different location. The direction towards this second footprint is the local direction of motion 6 and is indicated with an arrow in FIGS. 2*b* and 2*c*. The diameter of the liquid jet footprint 7 measured perpendicular to the direction of motion 6 is the local width of the trace 8.

Figure 3A:
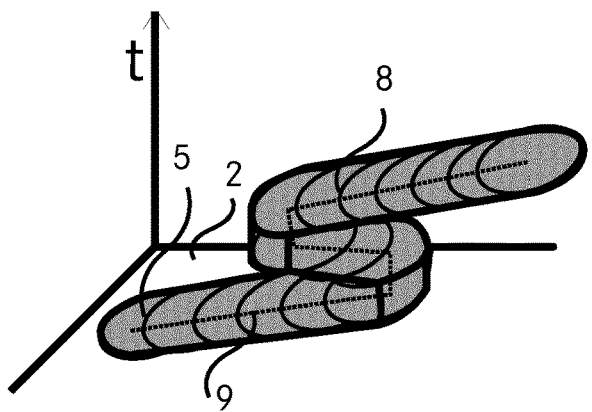
FIG. 3a, b Explanation of the trace, trajectory, centre-line and trace-area

FIG. 3*a* illustrates the concept of the trace 8 and the trajectory 9. Both, trace 8 and trajectory 9, are objects defined in reference surface coordinates and time t. The trace 8 is the combination of liquid jet footprints 5. As the liquid jet footprints 5 follow in time one after the other, the trace increases in time. As the liquid jet footprints 5 moves relative to the reference surface 2, the trace 8 evolves band-like in the reference surface coordinates. The trajectory 8 is a curve in time and reference surface coordinates which is composed of all liquid jet-footprint 5 centre points. The liquid jet-footprint centre point can be for example its centre of mass or the centre of the smallest circle surrounding the liquid jet-footprint or the centre of the largest circle which fits completely into it.

Figure 3B:
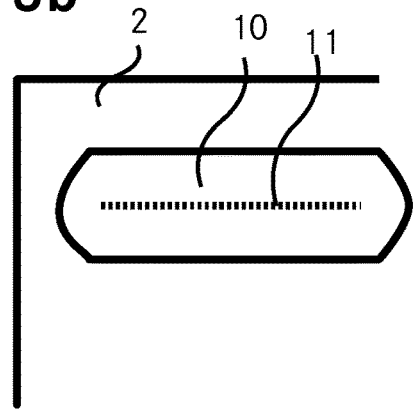

The trace area 10 and the centre-line 11 are simply the trace 8 resp. the trajectory 9 without the time coordinate. All references surface coordinates which occur more than once in the trace 8 or the trajectory 9, occur only once in trace area 10 resp. the centre-line 11. Centre-line 11 and trace-area 10 of the trace 8 and its trajectory 9 shown in FIG. 3*a* are shown in FIG. 3*b*.

Figure 4A:
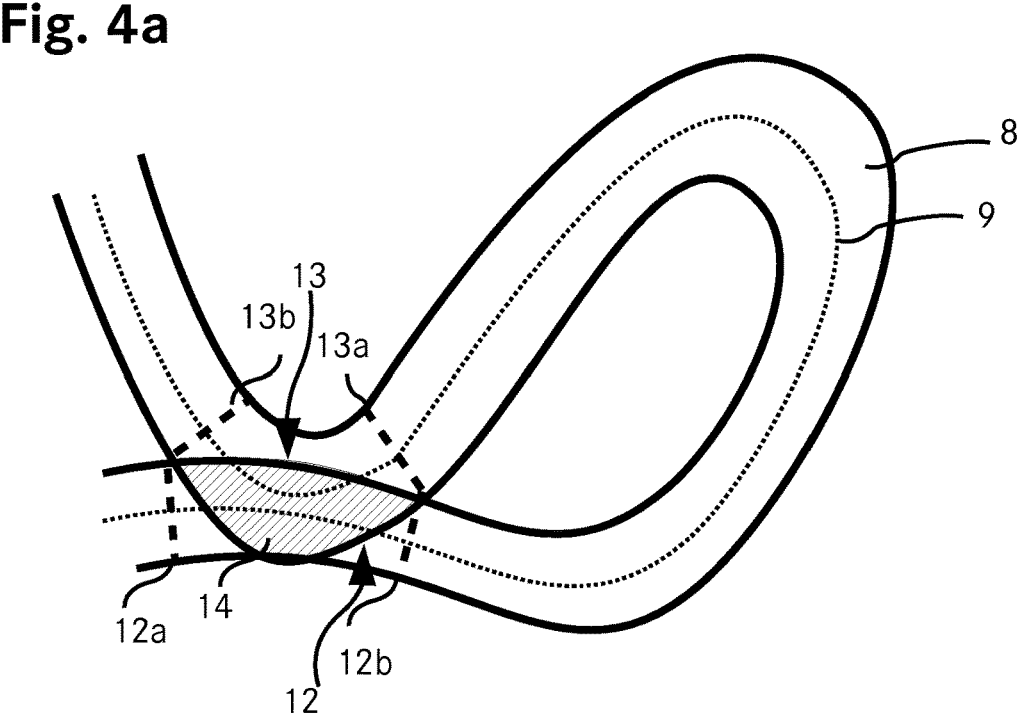
FIG. 4a, b, c, d, e, f Explanation of first and second length-section and overlap-area FIG. 5a Parallel cutting FIG. 5b Progressive cutting FIG. 5c Spiral-like trajectory or centre-line.

The processing strategy requires a first and a second length-section which have an associated common overlap-area 14. This situation is illustrated in FIGS. 4*a*) to 4*c*). FIG. 4*a*) shows a trace 8 and its trajectory 9 projected onto the reference surface, i.e. the time coordinate is not visible in this figure. There is one overlap-area 14, where the trace 8 has the same references surface coordinates but non-adjacent time coordinates. (Adjacent time coordinates can be defined as complete sets of time coordinates, i.e. the time coordinates are in either increasing or decreasing order and nowhere in the trace outside the studied interval, there is a time coordinate with a value between the minimum and the maximum value of this studied interval).

In the situation of FIG. 4*a*, assume that the boundary 12*a* of the first length-section in earliest in time, followed by the boundary 12*b* of the first length-section followed by the boundary 13*a* of the second length-section followed by the boundary 13*b* of the second length-section.

The first length-section is the length-section of the trace between the boundaries 12*a* and 12*b* and the second length-section is the length-section of the trace between the boundaries 13*a* and 13*b*.

The footprints inside the first or the second length-section overlap each other but do not define an overlap-area as the time coordinates inside the length-sections are adjacent to each other: a footprint of time 1 is overlapped by a footprint of time 2 and a third footprint of time 3 and so on, but in this case, a footprint of time 1 is not overlapped by footprints of times 2, 3 and 5 without the footprint of time 4.

The situation is differently when footprints of the first length-section overlap with footprints of the second length-section: The footprints of the first length-section have for example time coordinates between 1 and 10. The footprints of the second length-section have higher time coordinates, for example between 20 and 30, as time was needed for the trace section in between the first and the second length-section. There are therefore overlapping footprints with non-adjacent time coordinates like e.g. 10 and 20 or 5 and 21. Therefore the overlap-area 14 is an overlap-area in the sense of the definition. The first and the second length-sections are defined as the length-sections of the trace which are part of the overlap-area 14.

The boundaries of a length-section 12*a*, 12*b*, 13*a*, 13*b* are defined as straight lines which are perpendicular to reference surface coordinates of the trajectory 9. Their position is chosen such that the two boundaries defining one length-section (e.g. 12*a* and 12*b* or 13*a* and 13*b*) have a minimum distance from each other while including the complete overlap-area.

Figure 4B:
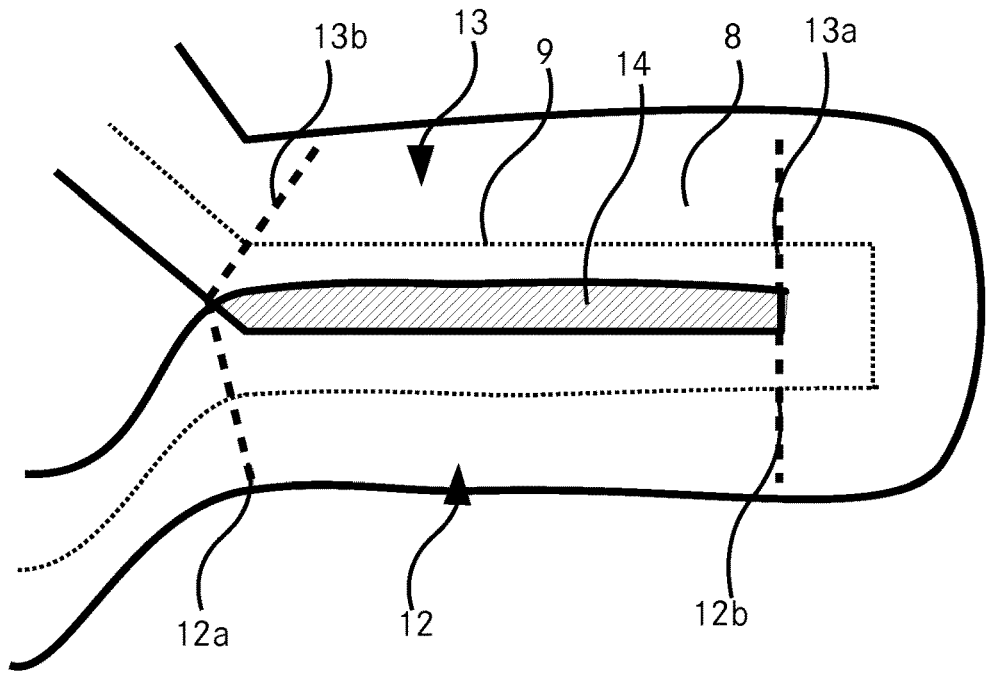

FIG. 4*b* shows an example where the separation between the first and the second length-section and therefore also the position of the length-section boundaries 12*b* and 13*a* is less obvious. It will be shown in FIGS. 4*d* to 4*f* that what is shown in FIG. 4*b* is just one out of three overlap-areas 14.

Figure 4C:
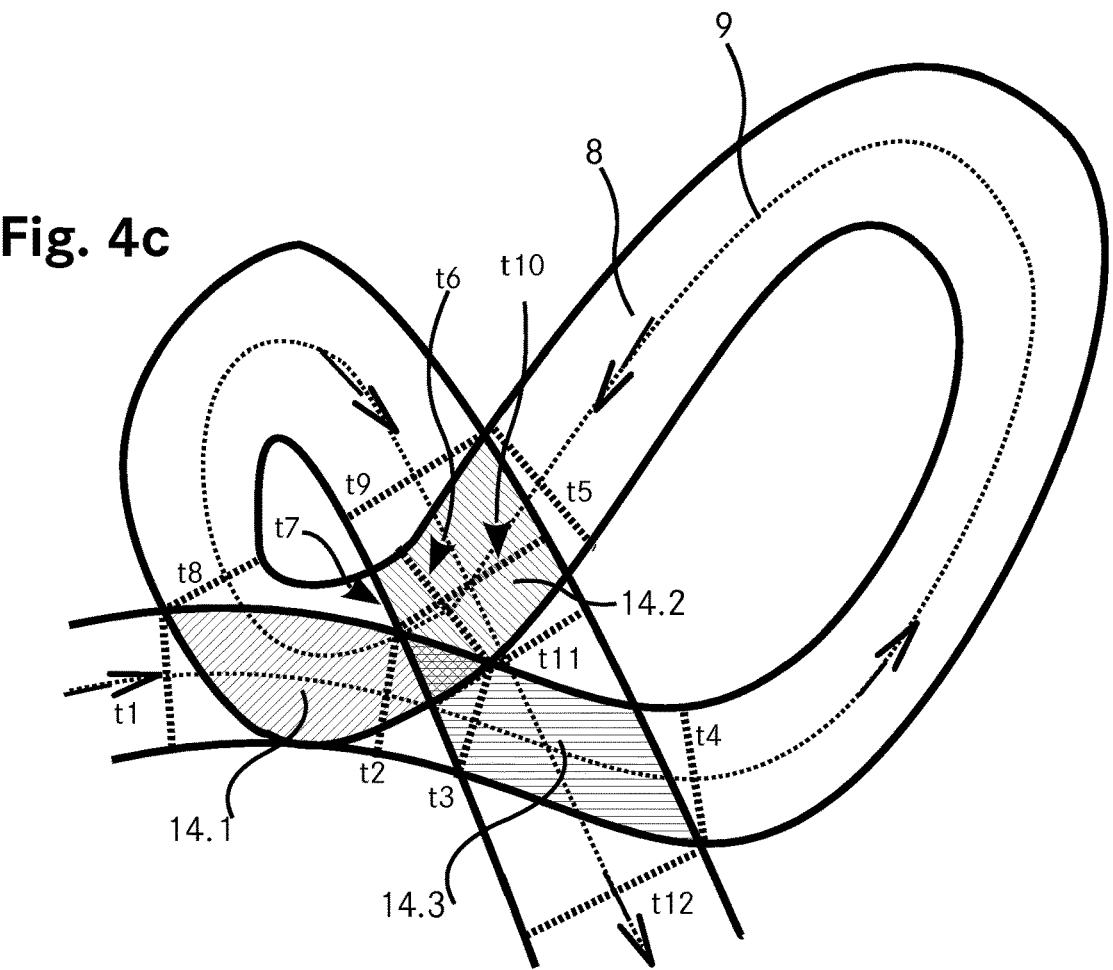

FIG. 4*c* shows a total of 3 overlap-areas (14.1, 14.2 and 14.3). The overlap-areas overlap each other, too.

The first overlap-area 14.1 is associated to the length-section from t1 to t3 and the length-section from t6 to t8.

The second overlap-area 14.2 is associated to the length-section from t5 to t7 and the length-section from t9 to t11.

The third overlap-area 14.3 is associated to the length-section from t2 to t4 and the length-sections from t10 to t12.

There is an area associated to the length-section from t2 to t3, the length-section from t6 to t7 and the length-section from t10 to t11. This area is part of all overlap-areas because:

The length-section from t2 to t3 is part of the length-section from t1 to t3 and the length-section from t6 to t7 is part of the length-section from t6 to t8. Therefore the area belongs to the first overlap-area.

The length-section from t6 to t7 is part of the length-section from t5 to t7 and the length-section from t10 to t11 is part of the length-section from t9 to t11. Therefore the area belongs to the second overlap-area.

The length-section from t2 to t3 is part of the length-section from t2 to t4 and the length-section from t10 to t11 is part of the length-sections from t10 to t12. Therefore the area belongs to the third overlap-area.

Figure 4D:
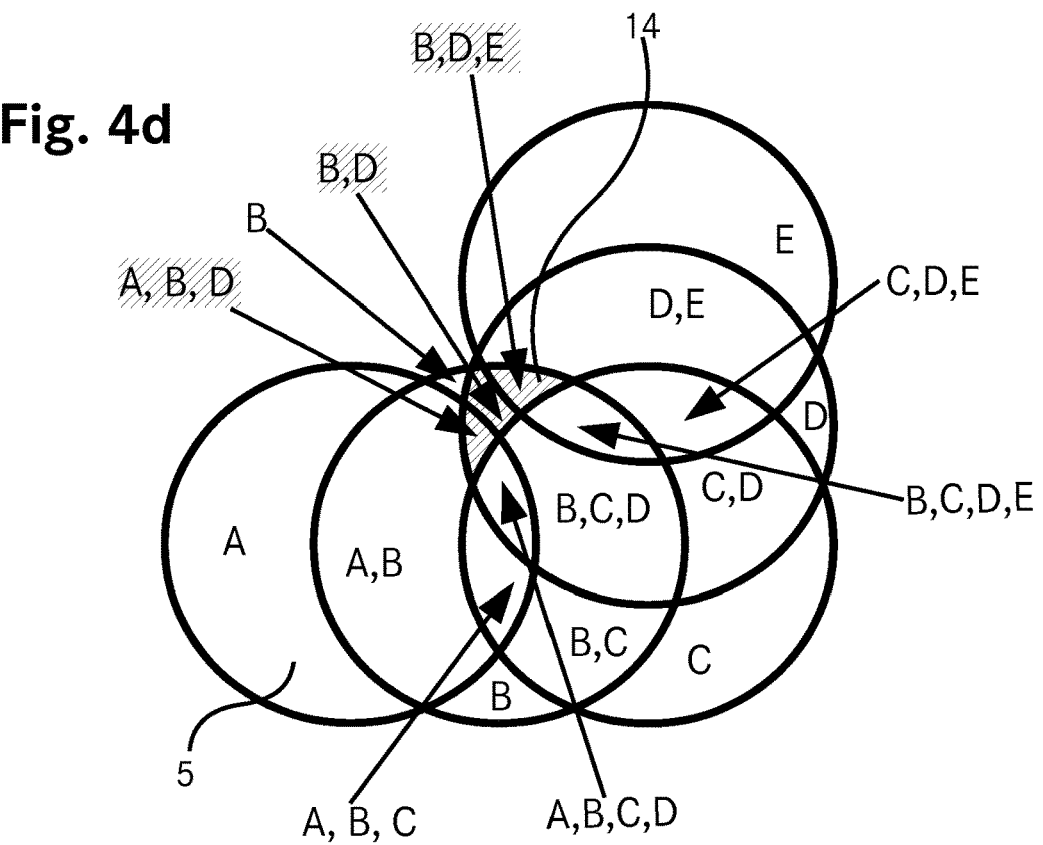
Figure 4E:
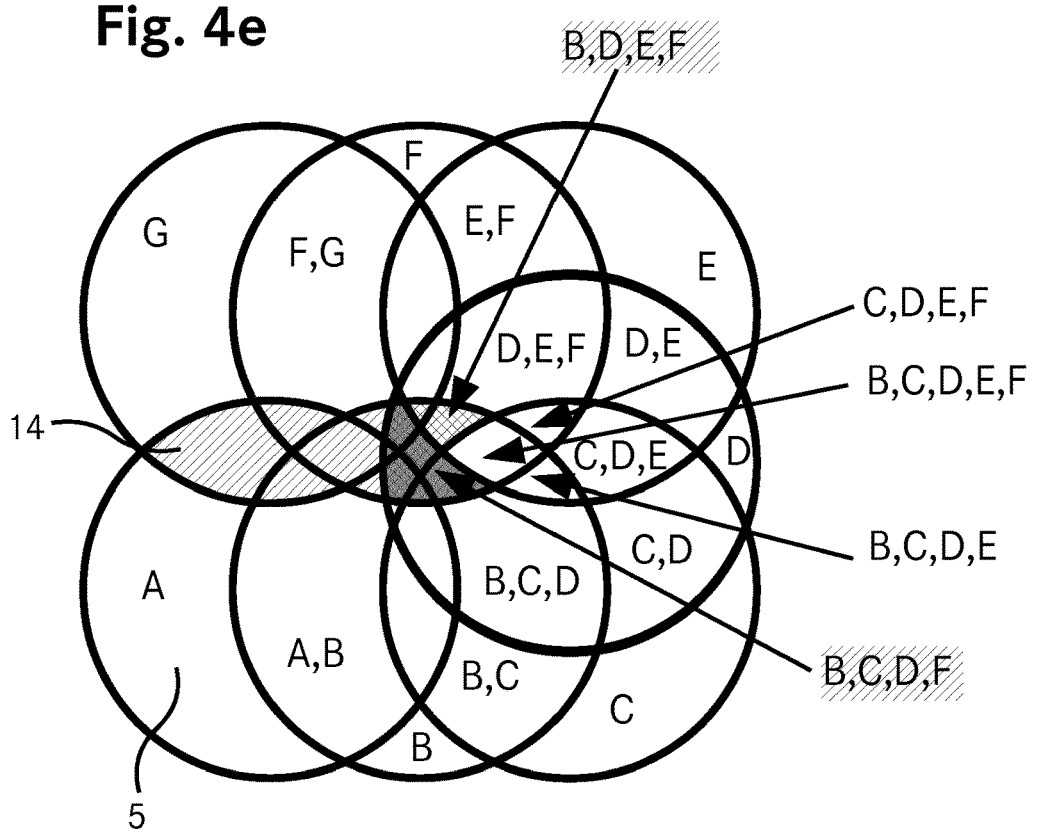
Figure 4F:
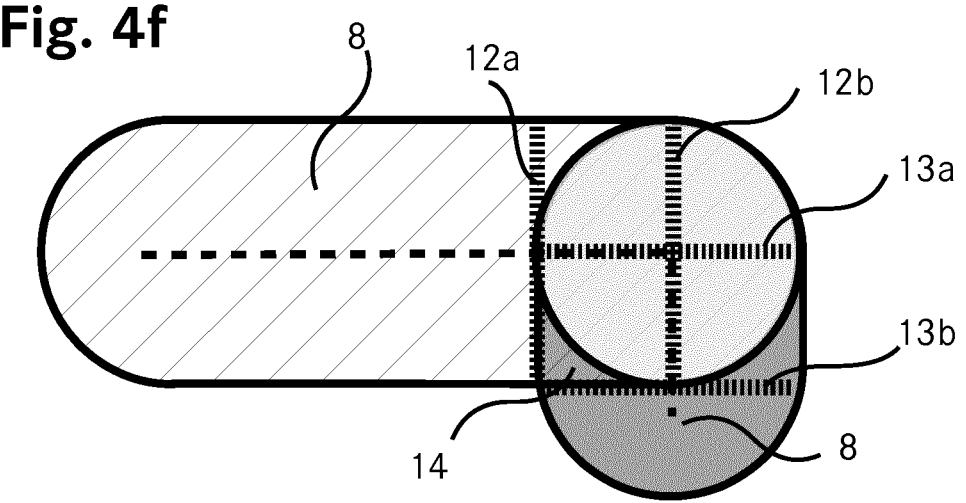
Figure 4F:
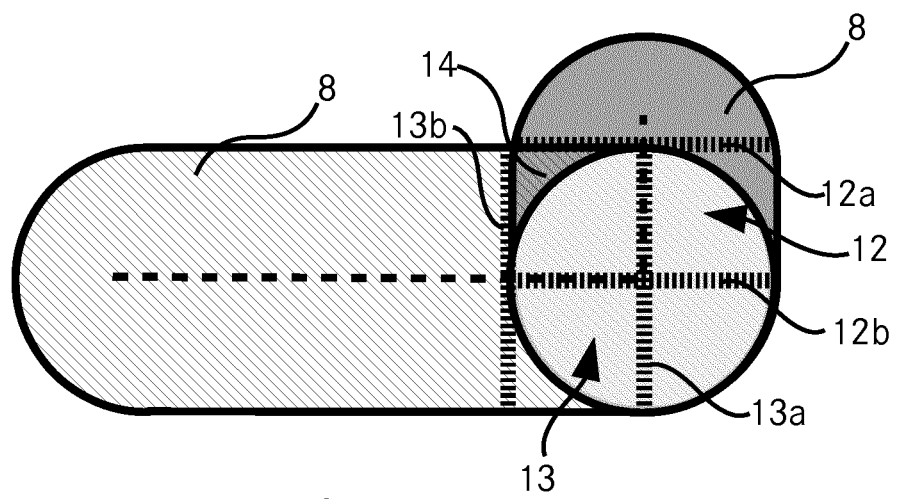
Figure 4F:
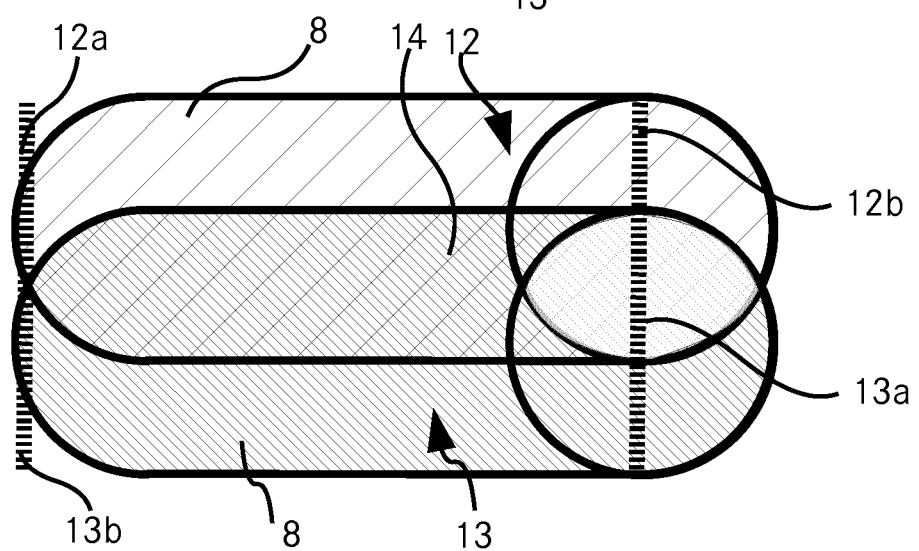

FIG. 4*d* to 4*f* illustrate the definition of overlap-area in the case of a right-angled curve. A right-angled curve is a curve where the trajectory describes a right angle in the reference surface coordinates or where the centre-line describes a right angle. FIG. 4*d* shows a detail of one single right-angles curve. For illustrative purposes, the preferably continuous liquid jet was sampled in regular time steps. Therefor a finite number of liquid jet footprints 5 are shown which overlap each other. The times of each footprint are denoted with letters from A to E. For each area covered by any time step, a list of the times associated with the footprints which cover this area can be derived. Following the definition given above, an area is an overlap-area if this list of times contains non-adjacent elements.

In the shown example, there is an area covered by the footprints with times [A, B, C] and another area covered by the footprints with times [C, D, E]. These are normal parts of the trace as all elements are adjacent. There are however also areas covered by footprints with times [A, B, D] or with times [B, D] or with times [B, D, E]. In all these lists, the footprint with time C is missing and therefore there are non-adjacent elements. These are therefore overlap-areas. As the missing element in these lists is in all cases "C", one can construct two time intervals which overlap each other: [A, B] overlaps [D, E]. This means, that one first length-section comprises at least partially the footprints in the time interval [A, B] and the second length-section comprises at least partially the footprints in the time interval [D, E].

FIG. 4e shows the situation in the case of a right-angled 180° curve. These are two 90° right-angled curves behind each other. In the shown example, the two right-angled curves are separated by a distance smaller than one footprint diameter.

With the same approach as explained in FIG. 4d, one finds that there are 3 overlap-areas 14 which overlap each other partially.

There are two overlap-areas corresponding to the one shown in FIG. 4d. These two overlap-areas overlap each other partially.

The first and second length-sections comprise in the first case at least partially the footprints in the time interval [A, B] and [D, E]. The footprint at time C is missing. This first overlap-area is marked with crossed hatching.

The first and second length-sections comprise in the next case at least partially the footprints in the time interval [C, D] and [F, G]. The footprint at time E is missing. This second overlap-area is marked in grey.

These two overlap-areas overlap in an area which does not belong to the footprint of time E or C.

The third overlap-area is associated to a first and a second length-section which comprise at least partially the footprints in the time interval [A, B] and [F, G]. At least one of the footprints at times C, D and E are missing. This third overlap-area is marked with diagonal hatching, in grey and with crossed hatching. Note however, that it is a coincidence and partially due to the drawing accuracy that the areas of the first and the second overlap-area seem to be completely included in the third overlap-area.

FIGS. 4d and 4e allowed to construct the lists of the times of every area. However, with a continuous liquid jet, this method is not practical. FIG. 4f illustrates the transition to the case of a continuous liquid jet:

The trace 8 is divided into sections where one is sure that there is no overlap occurring. These sections are here the three straight sections which are marked one with wide hatching, one in grey and one with fine hatching in FIG. 4f.

The relationship of every pair of these sections is studied alone.

The first pair is the wide hatched and the grey section.

The first criterion for an overlap-area is that the reference surface coordinates are the same. This is the case in the geometric overlap-area which has in this example a droplike form: It is the light colored circle and the triangle-like area (which turns out to be the overlap-area 14).

The second criterion for an overlap-area is the non-adjacent time coordinates. The light circle indicates the reference surface coordinates at which the wide hatched section is connected to the grey section. Therefore the time coordinates are adjacent in this region and thereby the area of the light circle is excluded.

The triangle-like shaped region is therefore the only region which fulfills both criteria and this is therefore an overlap-area 14.

The boundaries of the first length-section 12a and 12b are simply perpendicular to the trajectory in the reference surface coordinates and placed at the beginning and the end of the overlap-area 14. The same applies to the boundaries of the second length-section 13a and 13b. The boundaries 12b and 13a are, in this example, at a discontinuity. The orientation of "perpendicular to the trajectory" is in these cases preferentially given by the orientation just before the discontinuity whereby "before" is on the side of the discontinuity towards the other boundary of the same length-section. In this example here, the orientation of the boundary 12b is thereby perpendicular to the trajectory just left of the discontinuity as the boundary 12a is left of the discontinuity. The orientation of the boundary 13a is perpendicular to the trajectory just below the discontinuity as the boundary 13b is below of the discontinuity.

The second pair of sections is the grey and the fine hatched section. The situation is analogue to the one of the first pair.

The third pair of sections is the wide and the fine hatched section. Again the first criterion, same reference surface coordinates, is applied first and an elongated, pointed shape is found as geometric overlap area. Then regions with adjacent time coordinates connecting the two sections are searched. Here, it has to be remembered, that the grey section does exist and can connect time coordinates to fulfill the criterion. The grey section connects the two circles in time coordinates and each circle indicates a connection point to one of the hatched sections. Therefore there is a continuous connection in time at all reference surface coordinates inside the common area of the two circles which is marked with a light grey in this Figure. Excluding this region of adjacent time coordinates from the geometric overlap area gives the overlap-area 14.

FIGS. 5a to 5d illustrate different embodiments of the processing strategy.

Figure 5A:
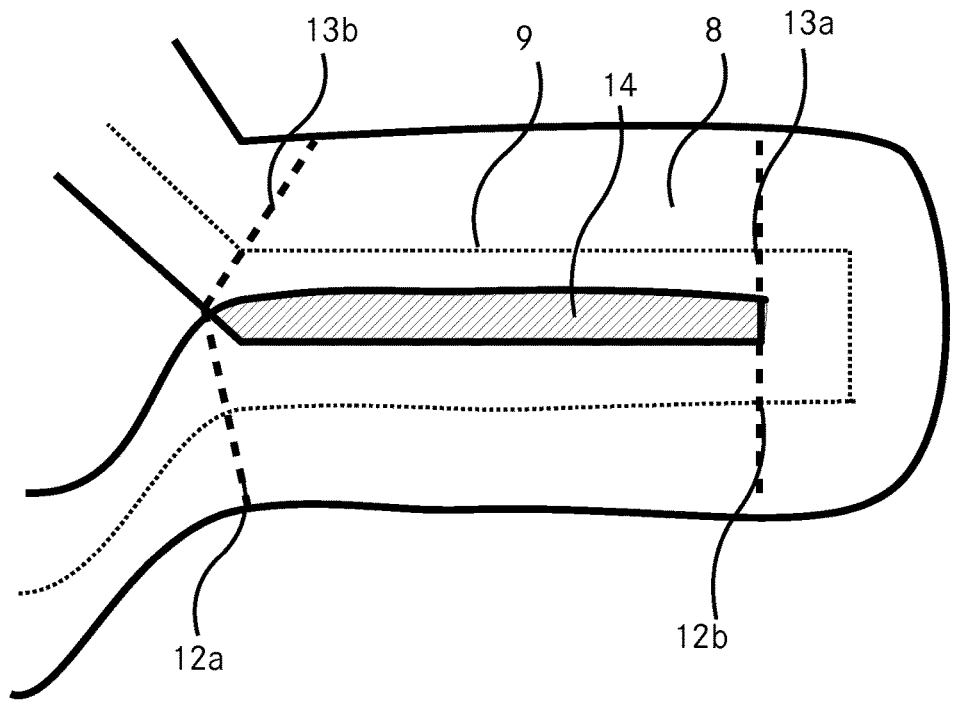
FIG. 5d Finishing pass

FIG. 5a shows an example of parallel cutting: The trace 8 forms an overlap-area 14 and its first and second length-section are the trace sections between the first resp. second length-section boundaries (12a and 12b for the first length-section; 13a and 13b for the second length-section). The trajectories 9 of the first and the second length-section are substantially parallel. The distance between the trajectories 9 is smaller than one mean footprint diameter as there would be no such overlap-area as shown here otherwise. The footprint diameter has, assuming a substantially flat reference surface and vertical incidence of the liquid jet onto the surface, a value close to the one of the nozzle diameter. Therefore the distance between the trajectories 9 is in this example smaller than one nozzle diameter. In FIG. 5a the overlap-area has a thickness of about ¼ of the mean footprint diameter. Therefore the distance between the trajectories is about ¾ of the mean footprint diameter and about ¾ of the nozzle diameter.

Figure 5B:
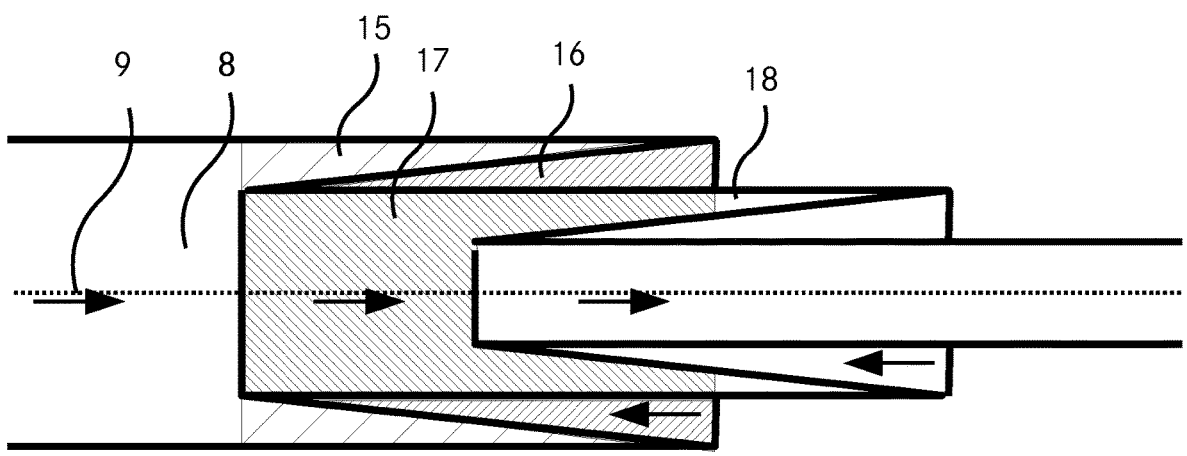

FIG. 5b illustrates the progressive cutting. For illustrative purposes a case is shown where the footprint diameter and therefore the trace width reduces with time. Further the turning points are also for illustrative purposes shown as straight lines. For most choices of footprint shapes, the turning points are more rounded. The trace 8 and its trajectory 9 have a folded shape. The arrows indicate the direction of time.

There are two progressive cutting steps shown in FIG. 5b. Only one of these steps is labelled. The first advance segment 15 is shown with wide hatching. The return segment 16 is marked with fine hatching with going up from left to right. The first overlap-area is the overlap-area of the first advance segment 15 and the return segment 16 and has in this example the same size as the return segment 16.

The return segment 16 is overlapped by the second advance segment 17. The resulting second overlap-area has the shape of the second advance segment 17 in this example.

It is obvious in FIG. 5b that the first overlap-area with the size, shape and position of return segment 16 and the second overlap-area with the size, shape and position of the second advance segment 17 have a common area. This common area is has the size, shape and position of the second advance segment 17 and is obviously superposable with the second overlap-area.

An example of where this is not the case was shown is FIG. 4c: There are two overlap-areas, each one with its first and second length-section, but the common area of the overlap-areas is in FIG. 4c not superposable with any of the overlap-areas. FIG. 4f however does show an example of progressive cutting: In the configuration shown there, the overlap-area between the wide hatched segment and the grey segment or the overlap-area between the grey segment and the fine hatched segment lie completely inside the overlap-area of the wide and the fine hatched segment. Therefore the common area of any one of the small overlap-areas and the large overlap-area is superposable with the respective small overlap-area. If however, the distance between the wide and the fine hatched segments is lager, the small overlap-areas lie only partially inside the large overlap-area and therefore it is not a progressive cutting anymore.

In FIG. 5b the third advance segment 18 is shown, too.

For the second progressive cutting step, the first advance segment is composed out of part of the previous second advance segment 17 and the previous third advance segment 18. The return segment and the second advance segment are not labelled. The FIG. 5b does not show where the third advance segment of the second progressive cutting step stops.

Figure 5C:
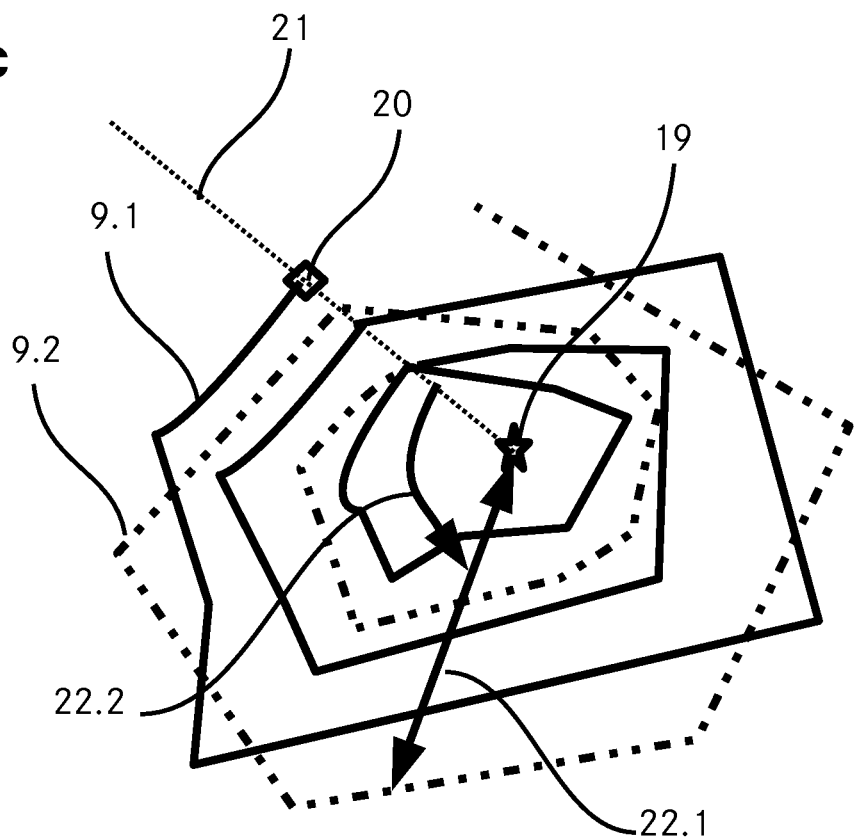

FIG. 5c shows a curve with a spiral-like character and its construction. There is a centre point of a spiral 19 and a starting point 20. The reference line 21 starts at the centre point of a spiral 19 and extends through the starting point 20. For every point in the area, a radius 22.1 and an angle 22.2 can be determined. Here the spiral-like curve is a trajectory which reduces the radius of its points with increasing length. This is the part 9.1 of the trajectory. Close to the centre point of a spiral 19, the radius of the points of the trajectory increases with increasing length and the part 9.2 of the trajectory results.

Figure 5D:
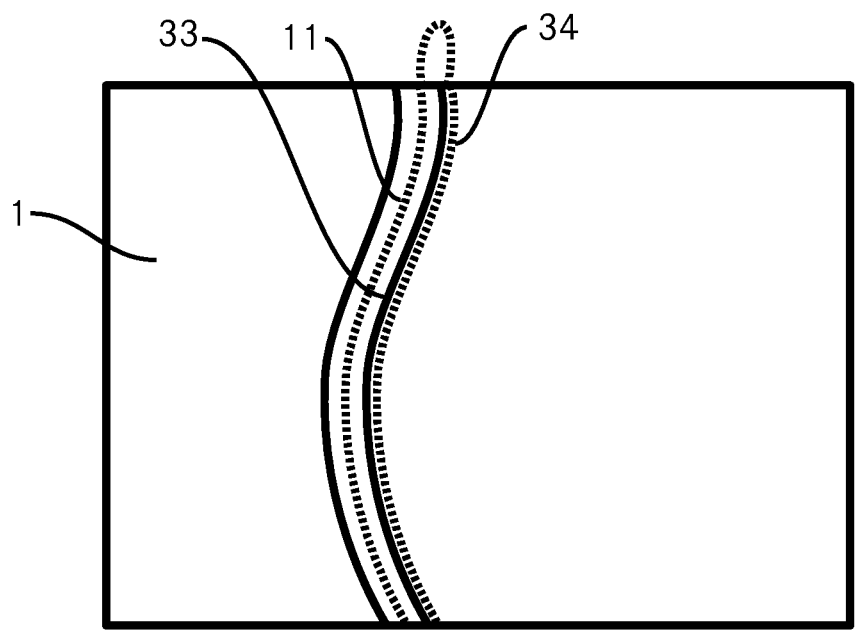

FIG. 5d finally illustrates the finishing pass process. The workpiece 1 should get a high quality edge 33. Before that, a region in front of the edge was machined with the laser coupled into the liquid jet with processes having a centre-line 11. In a last step, the liquid jet with coupled laser is moved such that the resulting centre-line 34 is parallel shifted with respect to the previous centre-line 11. This shift is done towards the desired high quality edge 33.

Figure 6:
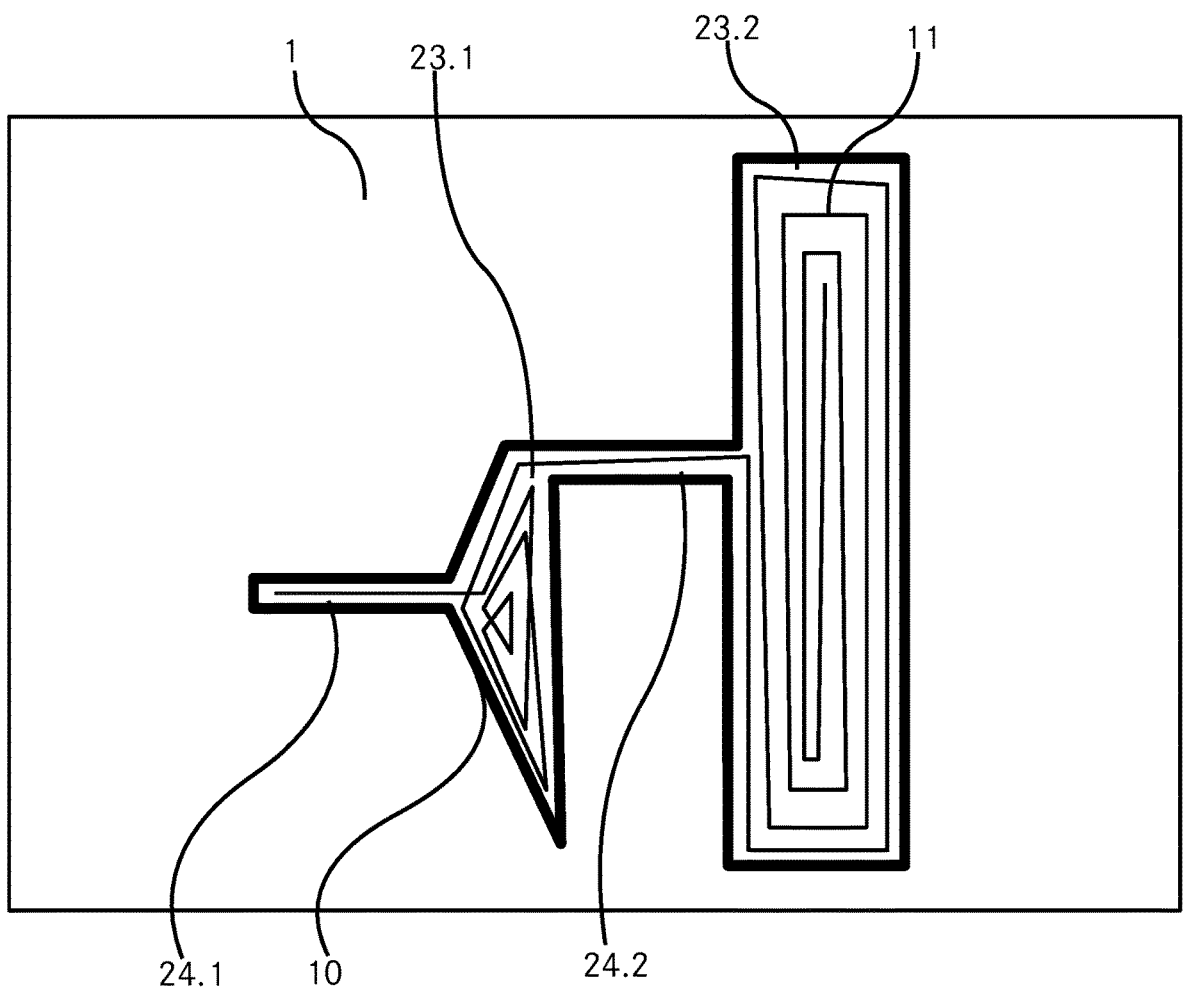
FIG. 6 Cutting complex shapes

FIG. 6 shows an example for a centre-line 11 when a pattern with larger oversize regions 23.1 and 23.2 and connecting regions 24.1 and 24.2 should be machined into the workpiece 1. The centre-line 11 can be a straight line along the connecting regions 24.1 and 24.2. Also the parallel cutting can be used here, but this is not shown in FIG. 6. The larger oversize regions 23.1 and 23.2 are machined by processes with spiral-like centre-lines 11.

Figure 7:
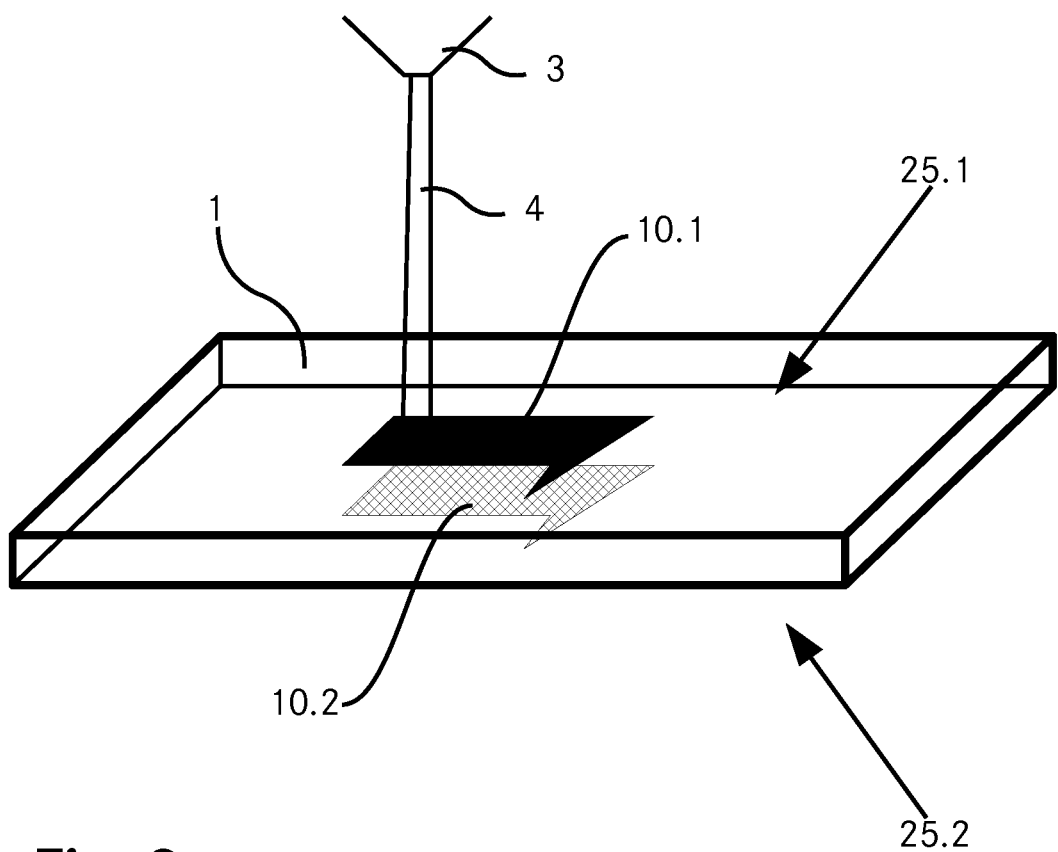
FIG. 7 Machining front- and back-side

In some cases, processing strategies can be used on two opposite sides of a workpiece 1. This is shown in FIG. 7. The workpiece has a front side 25.1 and a backside 25.2. The front side 25.1 of the workpiece is a side onto which the liquid jet 4 impinges. The backside 25.2 is the side opposite of the front side 25.1. The trace-area 10.1 on the front area 25.1 and the trace-area 10.2 on the backside are superposable in the average direction of the liquid jet, i.e. if the liquid jet 4 impinges perpendicular onto the front side 25.1 the trace-area 10.1 lies directly above the trace-area 10.2 if the front side 25.1 is on the top. If however, the liquid jet 4 impinges on average in an angle of e.g. 45° and with a constant orientation with respect to the surface normal, the trace-area 10.2 on the backside 25.2 will be shifted by the workpiece thickness times the tangent of this angle (in the given example with an angle of 45° the shift equals the thickness of the workpiece). If the front and the backside 25.1 and 25.2 are not parallel or not even to each other, the trace-area 10.2 on the backside may be deformed compared to the trace-area 10.1 on the front side. The effects can add up so that e.g. non-parallel back- and front-side 25.1 and 25.2 and a non-perpendicular jet 4 result in a deformed and shifted trace-area 10.2 compared to the front side trace-area 10.1.

The backside 25.2 can be machined by either turning the workpiece 1 around or by moving the nozzle 3 below the workpiece 1. It is also possible that the workpiece 1 and the nozzle 3 are moved. Of course, the workpiece 1 and the nozzle 3 can be arranged side by side, too. In this case, the nozzle 3 or the workpiece 1 can change from one side to the other or turn around.

Figure 8:
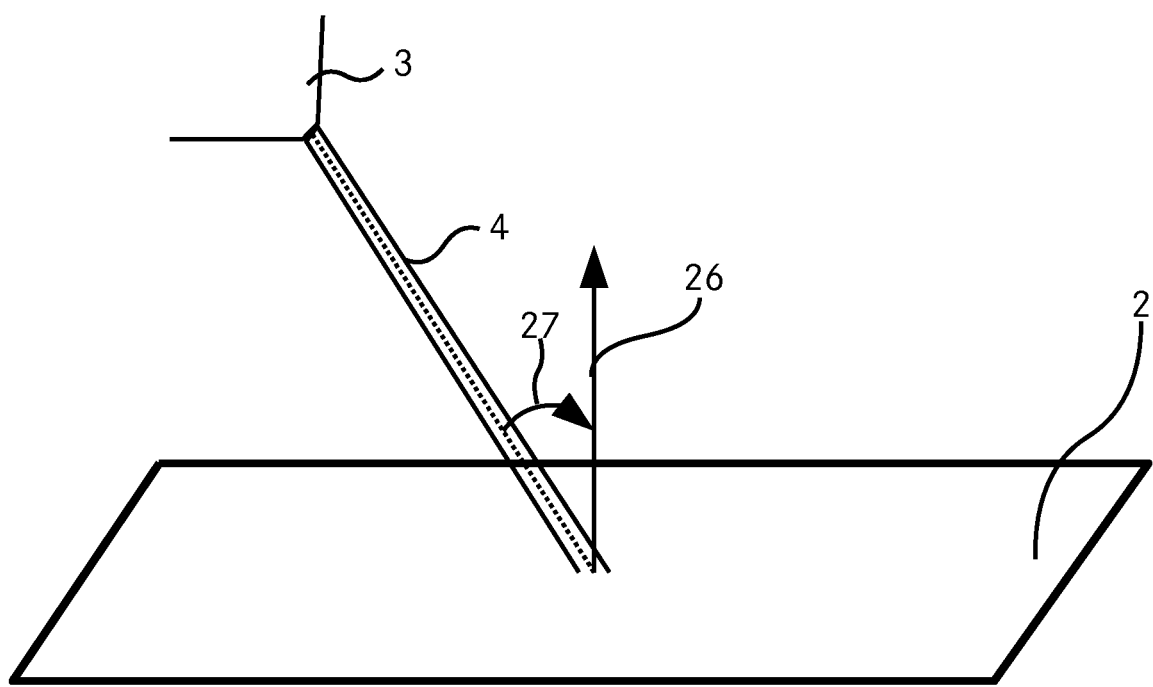
FIG. 8 Definition of impinging angle

FIG. 8 illustrates how the impinging angle 27 is defined: The nozzle 3 produces a liquid jet 4 which is located relative to the reference surface 2. This reference surface has a local normal vector 26. The direction of the normal vector 26 is chosen to be towards the nozzle side. The angle between the normal vector 26 at the centre point of the footprint of the liquid jet 4 and the central line of the liquid jet 4 is the impinging angle 27.

Figure 9:
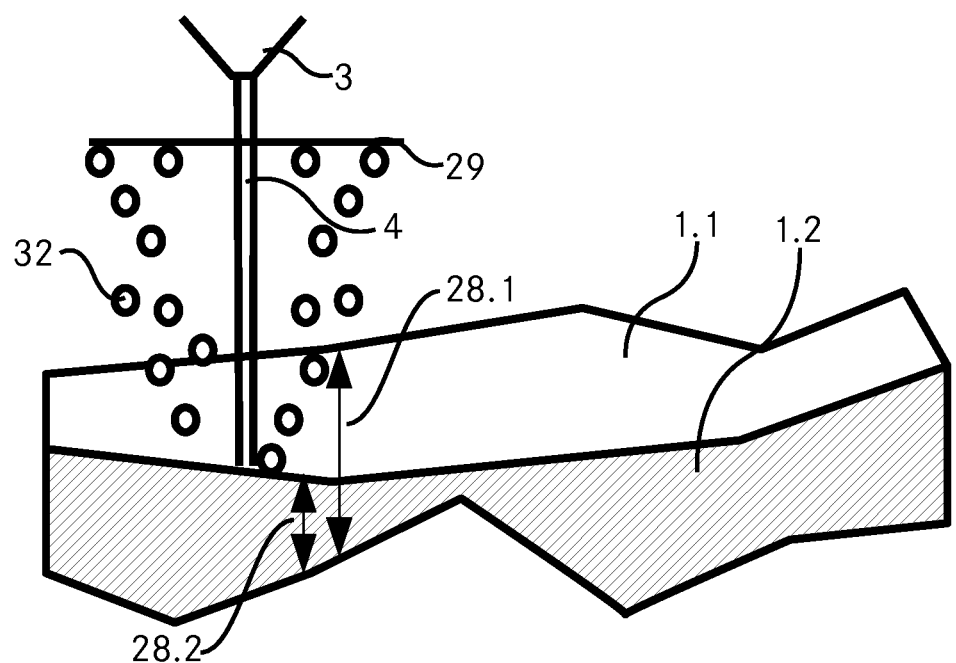
FIG. 9 Material thickness definition and use of a diaphragm

FIG. 9 shows the machining process in more detail. Here, a sectional view of the workpiece is shown: The hatched and solid white area shows the workpiece before the machining process 1.1 and the hatched area alone shows the workpiece after at least part of the machining process 1.2. Thicknesses 28.1 and 28.2 can be measured at every point of the workpiece 1.1 or 1.2 and are preferentially defined as distances in the direction of the liquid jet 4. The direction of the liquid jet 4 can be for example the direction at the moment when the jet 4 passes the point or an average direction. The average can be calculated weighted with the time or with the area passed by the jet 4 and it can be a local average (e.g. about the last seconds or the last millimeters around the point) or a global average (e.g. over the whole processing time or the total process). Before the start of the process or before passing a point or before determining the direction of the jet 4 is possible, the thickness 28.1 is preferably measured in the planed direction of the liquid jet 4. It is also possible to work always with the planed direction of the liquid jet 4.

When the liquid jet 4 impinges on the surface of the workpiece 1.1 or 1.2, water and ablated material 32 are scattered around. If this material hits the nozzle 3 it can cause negative effects on the liquid jet 4 and/or on the nozzle 3. Therefore it is desirable to protect the nozzle 3 from this material 32 by a diaphragm 29. This protection keeps most scattered material 32 away from the nozzle 3.

Figure 10:
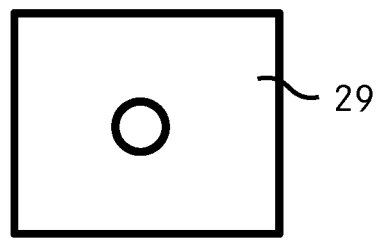
FIG. 10 Diaphragm

FIG. 10 shows a diaphragm 26 from above. It is essentially a flat plate out of a suitable material like a metal. There is a hole of the shape and size of the liquid jet cross-section in the flat plate. This hole can be produced before the diaphragm is mounted below the nozzle e.g. by drilling. Preferably however, the plate is mounted as a solid plate. Then the liquid jet guided laser is started and a hole of the desired shape and size is produced by the liquid jet guided laser ablating the plate material. It is also possible that a small hole is e.g. drilled or punched before in the plate and that the liquid jet guided laser is used to increase the hole to the desired shape and size.

Figure 11:
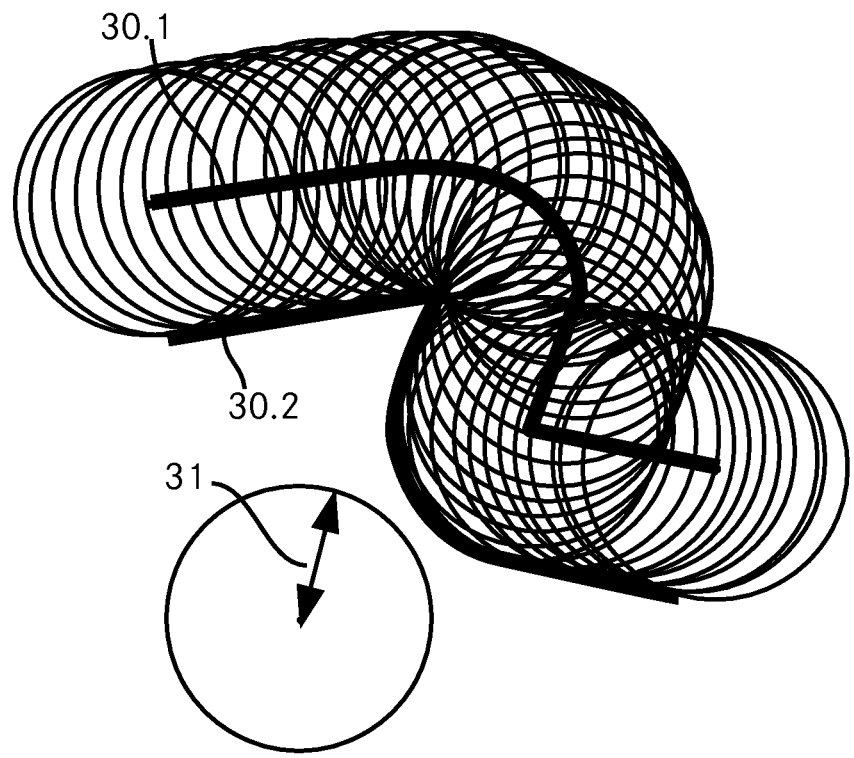
FIG. 11 Construction of parallel shifted lines.

FIG. 11 shows a method to construct curved, parallel lines. This figure was explained in detail in the definition of "parallel" given above.

Figure 12:
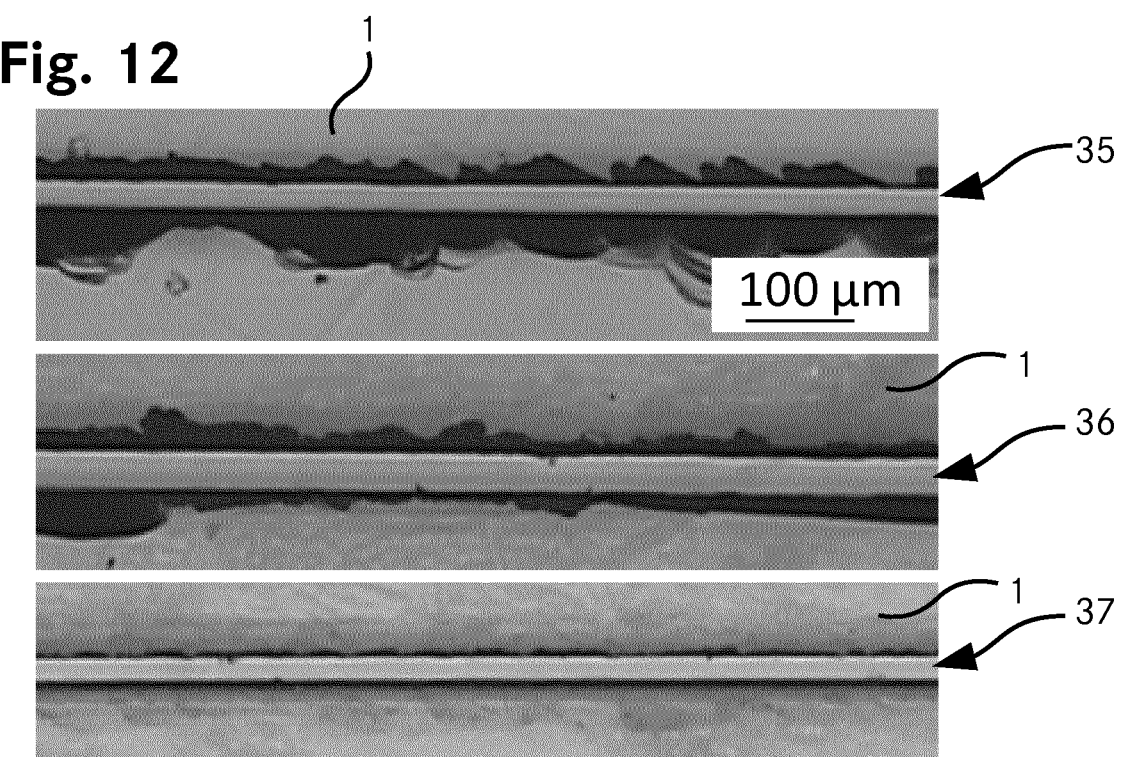
FIG. 12 Image of kerfs produced with different processes.

FIG. 12 shows the backside of a workpiece 1 with three different kerfs: The top most kerf 35 was produced with the prior art process of simply moving the liquid jet guided laser beam like a pencil over the workpiece 1. The amount of chipping is clearly visible. The second kerf from the top 36 was produced with the processes according to the embodiment "parallel cutting". The amount of chipping is reduced compared to the kerf 35 produced with the prior art process. The second kerf from the top 37 was produced with the process according to the embodiment "progressive cutting". The amount of chipping is the lowest of all three kerfs. However, the embodiment "progressive cutting" is in general slower than the embodiment "parallel cutting". Therefore the user or the computer program used by the user will decide on one embodiment weighting the needs for speed and edge quality against each other.

Figure 13A:
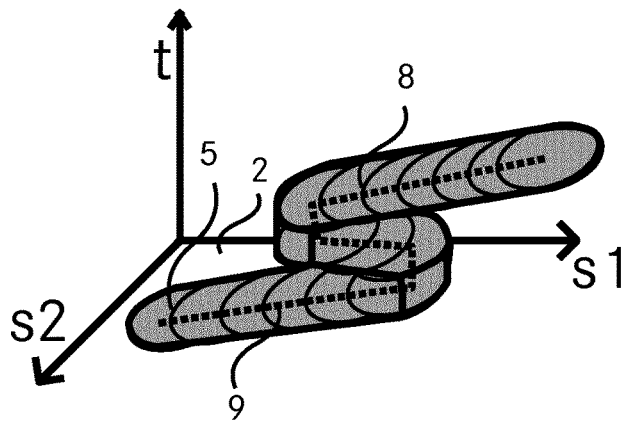
FIG. 13a, b, c Illustrating the definition of "overlap-area"
Figure 13B:
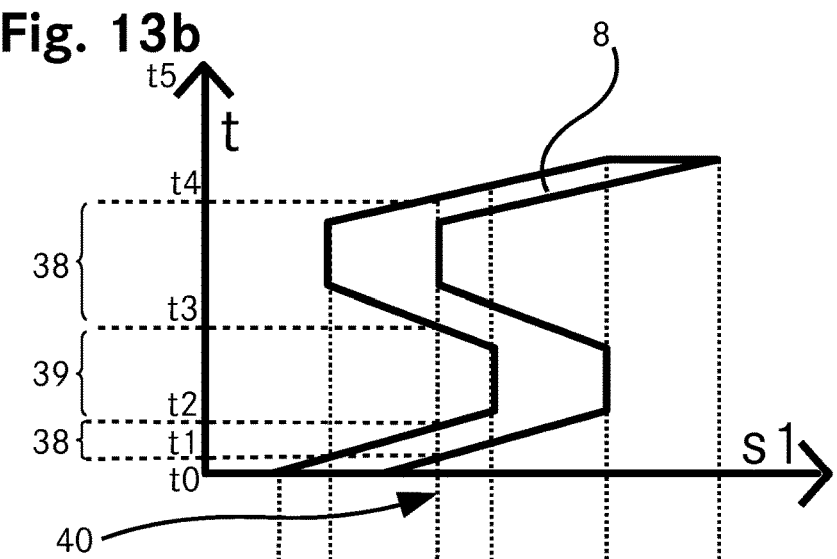

FIG. 13 should illustrate once more the definition of an overlap area 14. FIG. 13a is a copy of FIG. 3a showing the trace 8 with the trajectory 9 and some liquid jet-footprints 5 in the 2D+t-space. The reference surface 2 defines the reference surface coordinates s1 and s2. There is further the time coordinate t. FIG. 13b shows the projection of the same trace on the s1-t plane. The trace 8 appears as a band. At places where the trace evolves fast (i.e. the relative displacement between liquid jet and reference surface was fast) the trace 8 appears thin in this projection. At places where the relative displacement between the liquid jet and the reference surface stopped for some time, the trace 8 appears column-like. At a given time, which is in a given height in this diagram, there is always exactly one interval of s1-values part of the trace 8. The length of this interval depends on the size of the footprint 5. There is only one interval as there is only one liquid-jet footprint at one time. In this diagram, it is very easy to find intervals of adjacent time coordinates and gaps in the time. To illustrate the procedure follow the dotted line 40. It is a line of one constant s1-value. Starting from the lowest shown t-value and going to the highest, there is at first no trace 8 at the s1-value marked by the dotted line 40. Then the trace 8 is crossed by the dotted line 40. This means, that there is a first time interval, which is a time interval including only adjacent time coordinates 38. After crossing the trace 8, there are again times where there are no footprints and therefore no trace 8 at the s1-coordinate marked by the dotted line 40. But further up, the trace 8 is again crossed by the line 40, marking another interval of adjacent time coordinates 38.

Figure 13C:
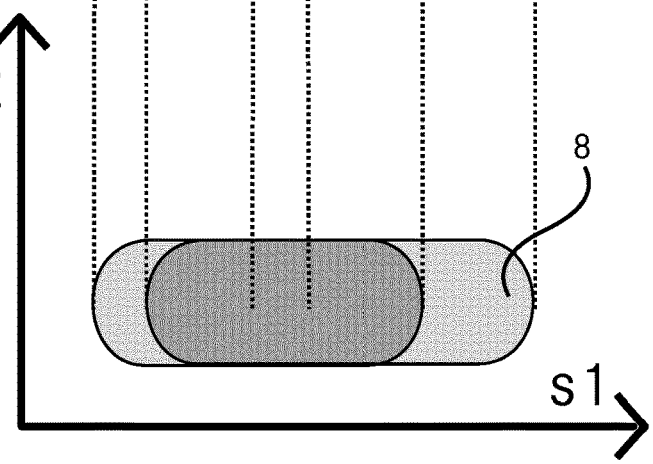

Looking at FIG. 13c, the projection of still the same trace 8 on the reference plane with its coordinates s1 and s2 is shown. To find common areas, the trace 8 and not the trace-area has to be shown. The difference between the trace 8 and the trace-area is that the trace 8 can overlap itself. In order to show the amount of overlap, the trace was colored with a transparent black: common areas appear therefore darker. There is obviously a common area at the s1-value marked with the dotted line 40.

To check if this common area is a overlap-area, we look again at FIG. 13b: The total time frame [t0, t5] can be divided into 5 intervals: [t0, t1]: no trace present, [t1, t2]: adjacent times, [t2, t3]: no trace present, [t3, t4]: adjacent times, [t4, t5]: no trace present. From this list, it becomes clear that there are not only adjacent times in the total time frame. There is a gap in time which is the interval [t2, t3] and therefore there is an overlap-area.

For s1-values little larger than the value marked by the dotted line 40, there are even three overlap-areas: FIG. 13c shows that there is a common area. FIG. 13b shows that the total time frame [t0, t5] can be divided into 7 intervals: starting from t0, there is first no trace present, then a first interval of adjacent times, a first gap in time, a second interval of adjacent times, a second gap in time, a third interval of adjacent times and finally no trace anymore. A first overlap-area is given by the first and the second interval of adjacent times and the first gap is the gap associated with the first overlap-area. A second overlap-area is given by the second and the third interval of adjacent times and the second gap is the gap associated with the second overlap-area. A third overlap-area is given by the first and the third interval of adjacent times and the associated gap is the combination of the first gap, the second gap and the second interval of adjacent times.

At the beginning and the end of the trace 8, there are no overlap-areas as there are no common areas.

FURTHER POSSIBLE VARIATIONS OF THE SHOWN EMBODIMENTS

Most examples and descriptions discussed here assumed round liquid jet-footprints 5. This is however not necessary: The liquid jet-footprints 5 can have different shape due to the nozzle 3, the impinging angle 27 or the tilt of the reference surface 2 and e.g. the liquid used.

If only the centre-line is shown, any embodiment which produces such a centre-line can be used. For example a simple forward motion and the progressive cutting can have the same straight centre-line.

The invention claimed is:
1. A process for shaping a workpiece by ablating material using a liquid jet guided laser beam within a time frame, comprising the following steps:
   a. producing a liquid jet by a nozzle,
   b. impinging the liquid jet on a reference surface allocated to the workpiece, whereby an intersection of the liquid jet with the reference surface defines a liquid jet-footprint,
   c. effecting a displacement between the liquid jet and the reference surface, whereby the liquid jet-footprint evolves to a trace along a trajectory associated with the trace during the time frame, wherein the trace covers a trace-area, and
   d. irradiating the workpiece at least during part of the time frame with a laser beam coupled into the liquid jet to ablate material, and
   e. monitoring the remaining thickness of the workpiece while irradiating the workpiece with the laser beam; and
wherein the trace has in sequence a first advance-segment, a return-segment and a second advance-segment, wherein
   i. the first advance-segment and the return-segment form a first and a second length-section of a first overlap area;
   ii. the return-segment and the second advance-segment form a first and a second length section of a second overlap area;

iii. a common area of the first and the second overlap area are essentially superimposable with at least one of these two overlap areas; and
iv. the trajectory is shifted in a reference surface coordinate direction, such that center lines of the different segments are displaced with respect with each other in such a way that the common area is part of the first advance-segment, of the return-segment and of the second advance-segment.

2. The process according to claim 1 wherein one or more of the following parameters are changed within the time frame:
e) the impinging angle,
f) space coordinates of the centre-line,
g) a speed of displacement, and
h) laser parameters.

3. The process according to claim 1, further comprising:
changing laser parameters, process parameters and/or liquid jet parameters based on an output of a measurement device by a Human-machine-interface program controlling and executing a CNC program.

4. The process according to claim 2, whereby one or more of the parameters are changed when it is detected that a portion of the material is difficult to remove.

5. The process according to claim 3, wherein:
the laser parameters comprise a laser pulse rate, a laser energy, or a laser radiation frequency; and/or
the liquid jet parameters comprise a pressure of the liquid jet, or a composition of the liquid.

6. The process according to 1, wherein an amount of the ablated material and/or the remaining thickness of the workpiece is determined by:
analyzing, by a measurement device, reflections of a measurement laser coupled into the liquid jet or the laser beam coupled into the liquid jet, to measure a distance from the nozzle to the workpiece surface.

7. The process according to claim 1, wherein an amount of the ablated material and/or the remaining thickness of the workpiece is determined by:
measuring, by a measurement device, a distance from the nozzle to the workpiece surface by using ultra-sound coupled into the liquid jet.

\* \* \* \* \*